United States Patent [19]

Woodhouse

[11] 4,152,933
[45] May 8, 1979

[54] WIND MONITORING ASSEMBLY AND METHOD

[75] Inventor: Charles F. Woodhouse, Clifton Forge, Va.

[73] Assignee: Approach Fish, Clifton Forge, Va.

[21] Appl. No.: 779,518

[22] Filed: Mar. 21, 1977

Related U.S. Application Data

[63] Continuation-in-part of Ser. No. 674,231, Apr. 6, 1976, Pat. No. 4,058,010.

[51] Int. Cl.² ............................................. G01W 1/02
[52] U.S. Cl. ........................................................ 73/189
[58] Field of Search ...................... 73/189, 188, 178 T; 116/DIG. 9; 340/26, 27 NA; 244/114 R, 153 R, 33, 32, 155 R

[56] References Cited

U.S. PATENT DOCUMENTS

| 698,634 | 4/1902 | Conyne | 244/153 R |
|---|---|---|---|
| 2,612,043 | 9/1952 | Chisholm et al. | 73/189 |
| 2,805,572 | 9/1957 | Carruthers | 73/189 |
| 3,091,420 | 5/1963 | Deguin | 244/155 R |
| 3,361,387 | 1/1968 | Struble | 244/33 |
| 3,986,396 | 10/1976 | Raymond | 73/189 |

FOREIGN PATENT DOCUMENTS

| 571804 | 5/1924 | France | 73/188 |
|---|---|---|---|
| 971300 | 1/1951 | France | 73/189 |
| 1297828 | 5/1962 | France | 73/189 |
| 147771 | 8/1967 | Japan | 73/189 |
| 3587970 | 5/1968 | Japan | 73/189 |

*Primary Examiner*—Anthony V. Ciarlante
*Attorney, Agent, or Firm*—Neil F. Markva

[57] ABSTRACT

A windborne vehicle is attached to one end of a tether line which is secured to a tether mast. The tether mast is secured to a ground anchor mechanism for rotative freedom about a vertical axis. The tether line is guided along the tether mast to align the tether mast with the line when the windborne vehicle is in flight. An angle sensing mechanism is effective to measure the azimuth angular displacement of the tether mast around the vertical axis with respect to a fixed reference alignment. A tether line tension sensing mechanism is used to measure the tension force on the tether line. Signals proportional to the angular displacement and the tension force are transmitted to a remote receiving station from the sensing mechanisms. Several different embodiments of the basic assembly show various uses of the invention.

66 Claims, 25 Drawing Figures

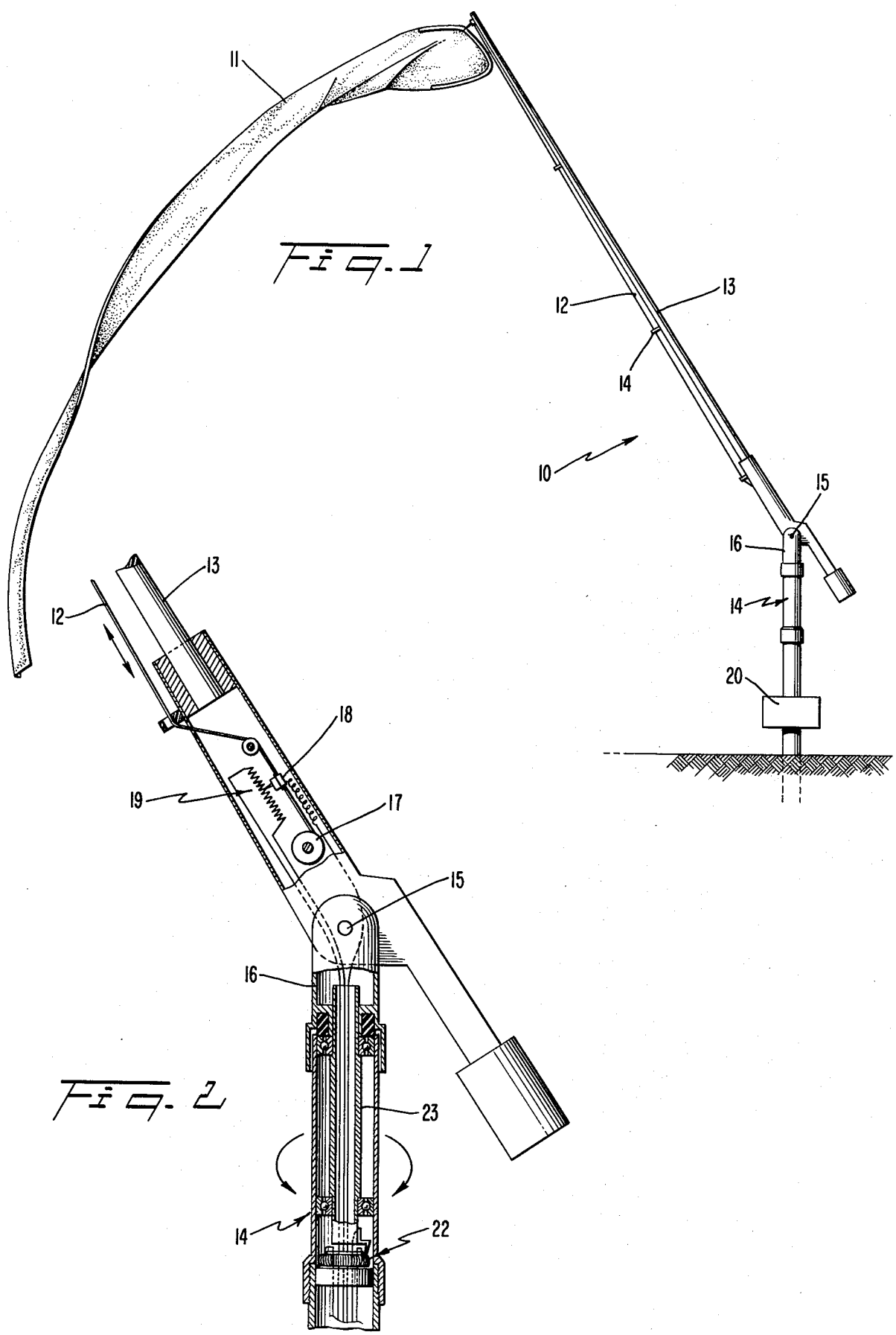

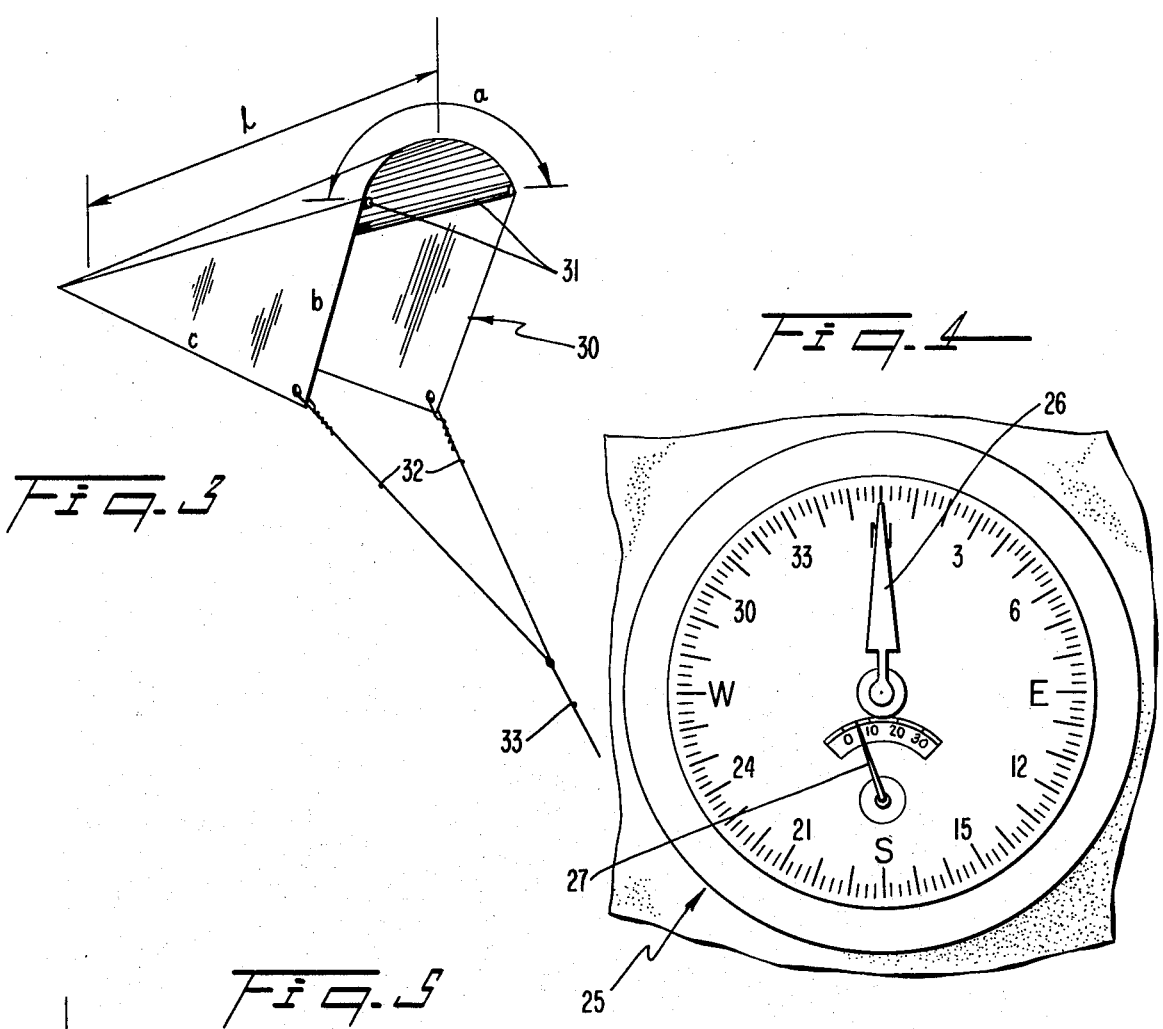
Fig. 3
Fig. 4
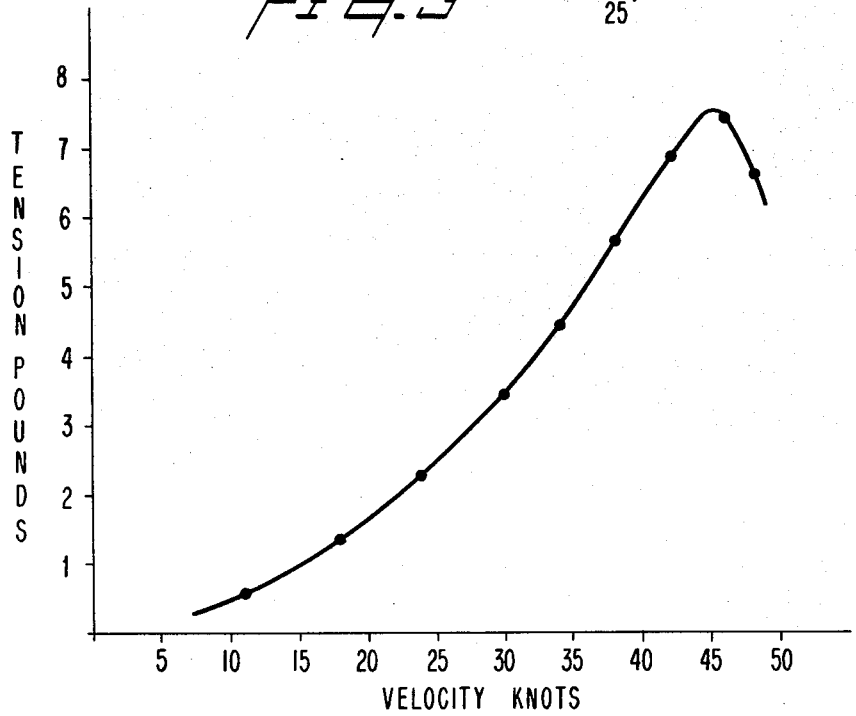
Fig. 5

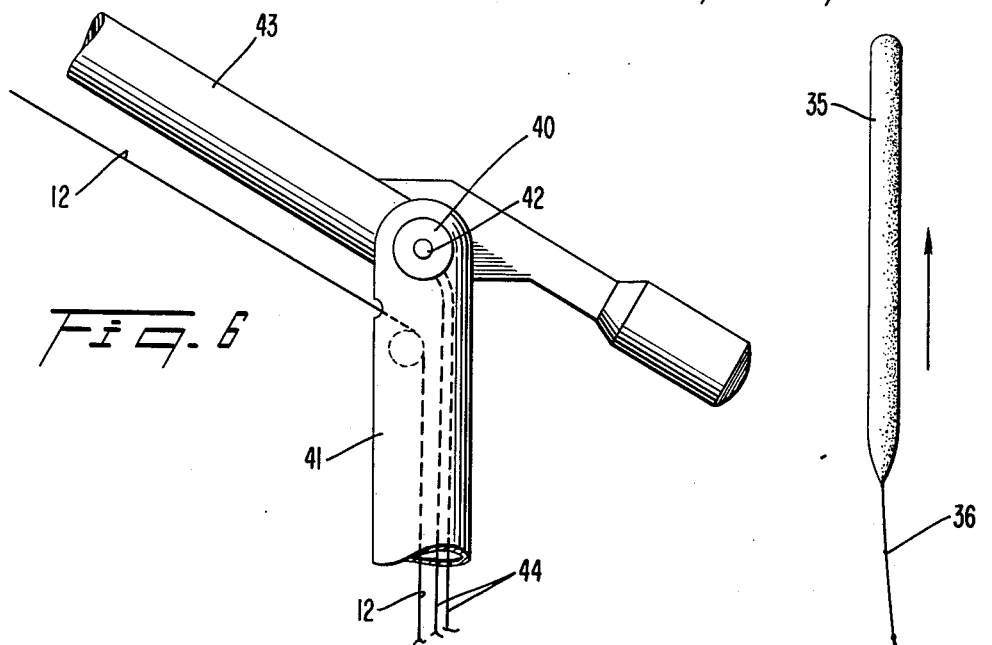
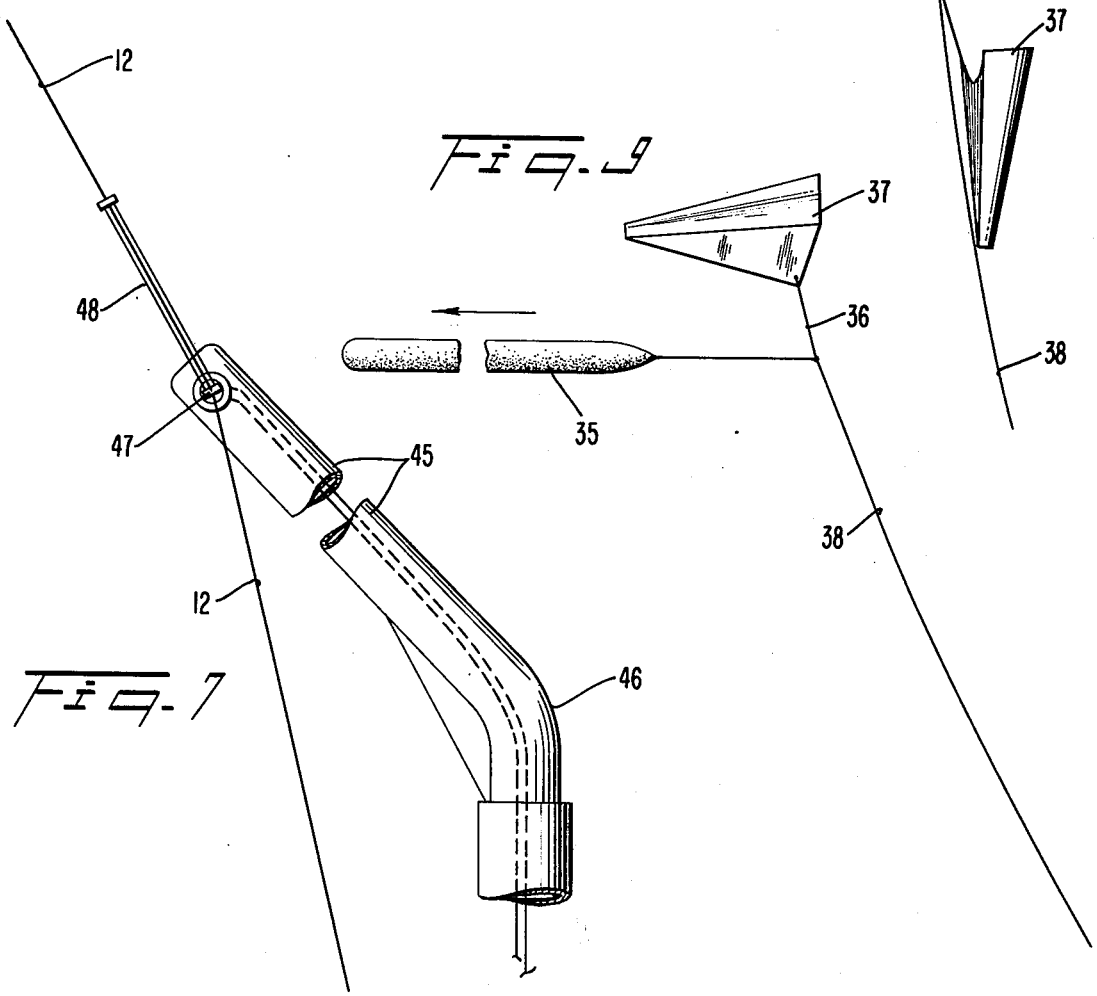

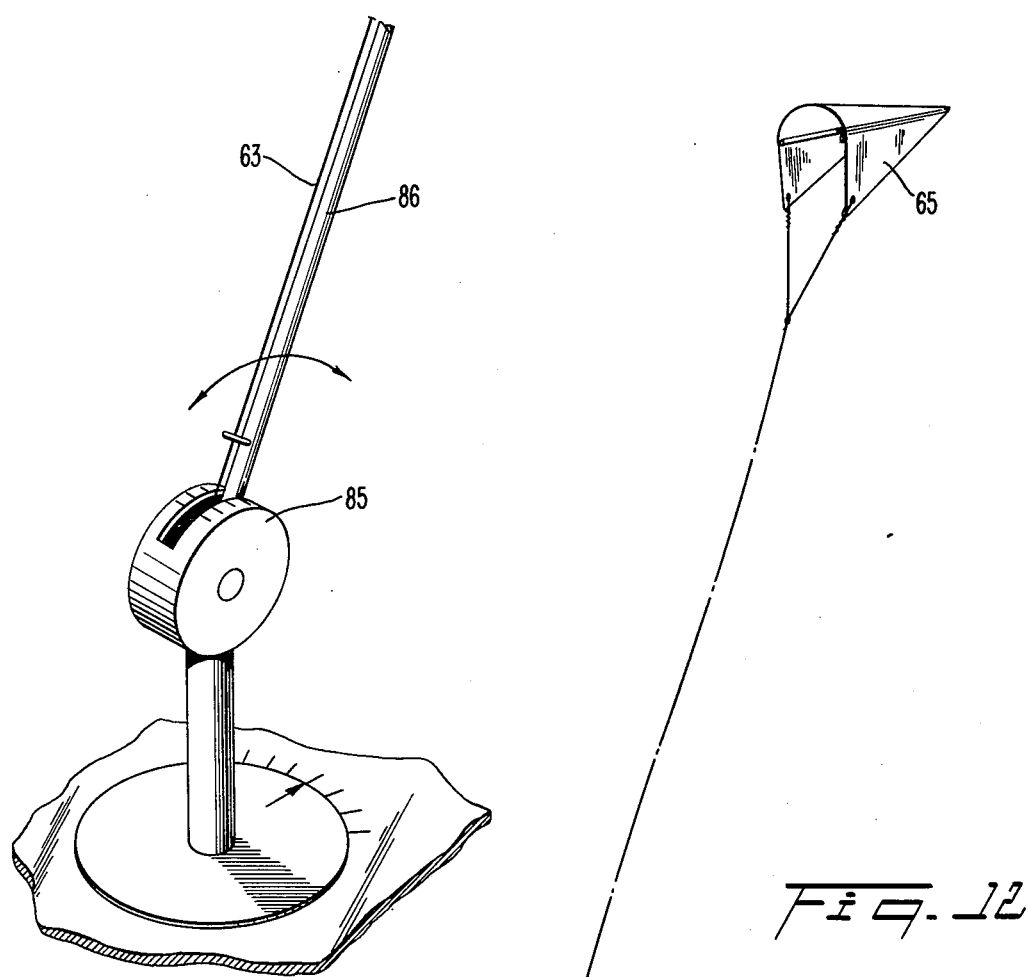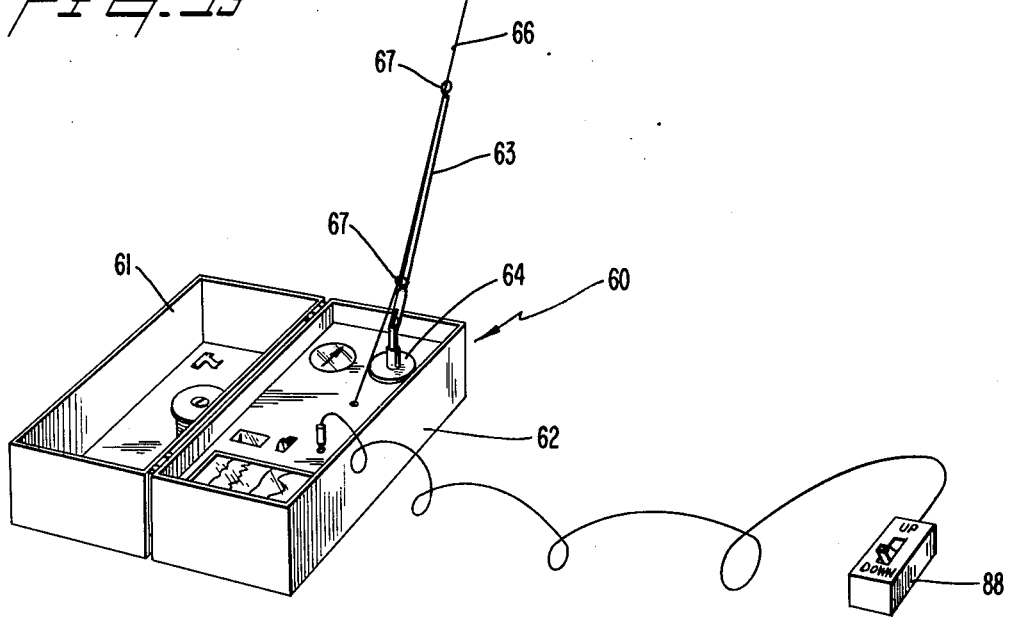

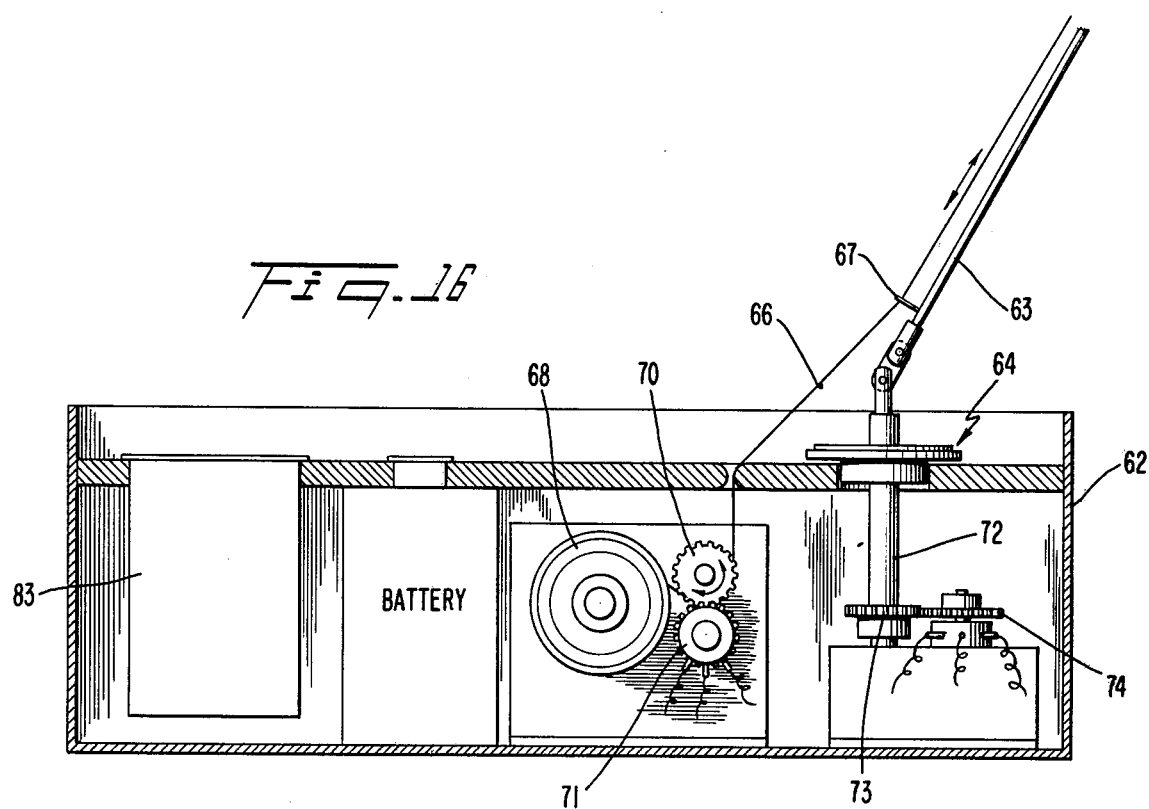
Fig. 16
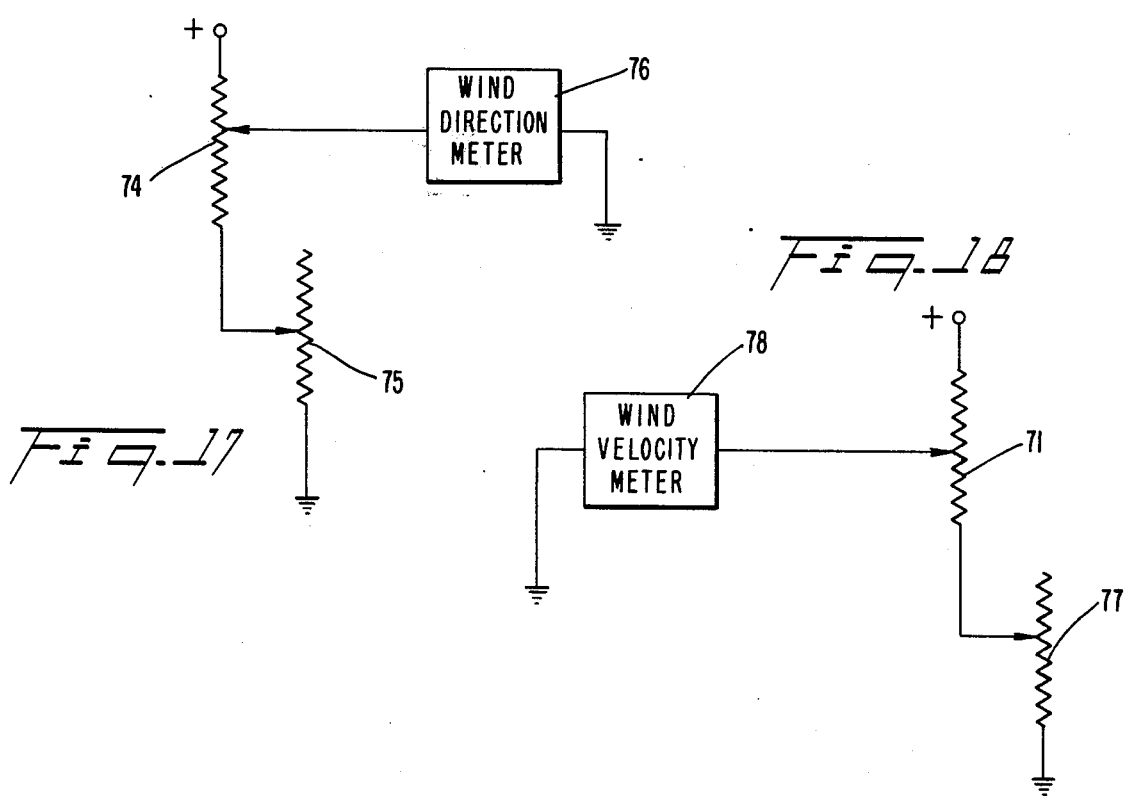
Fig. 17
Fig. 18

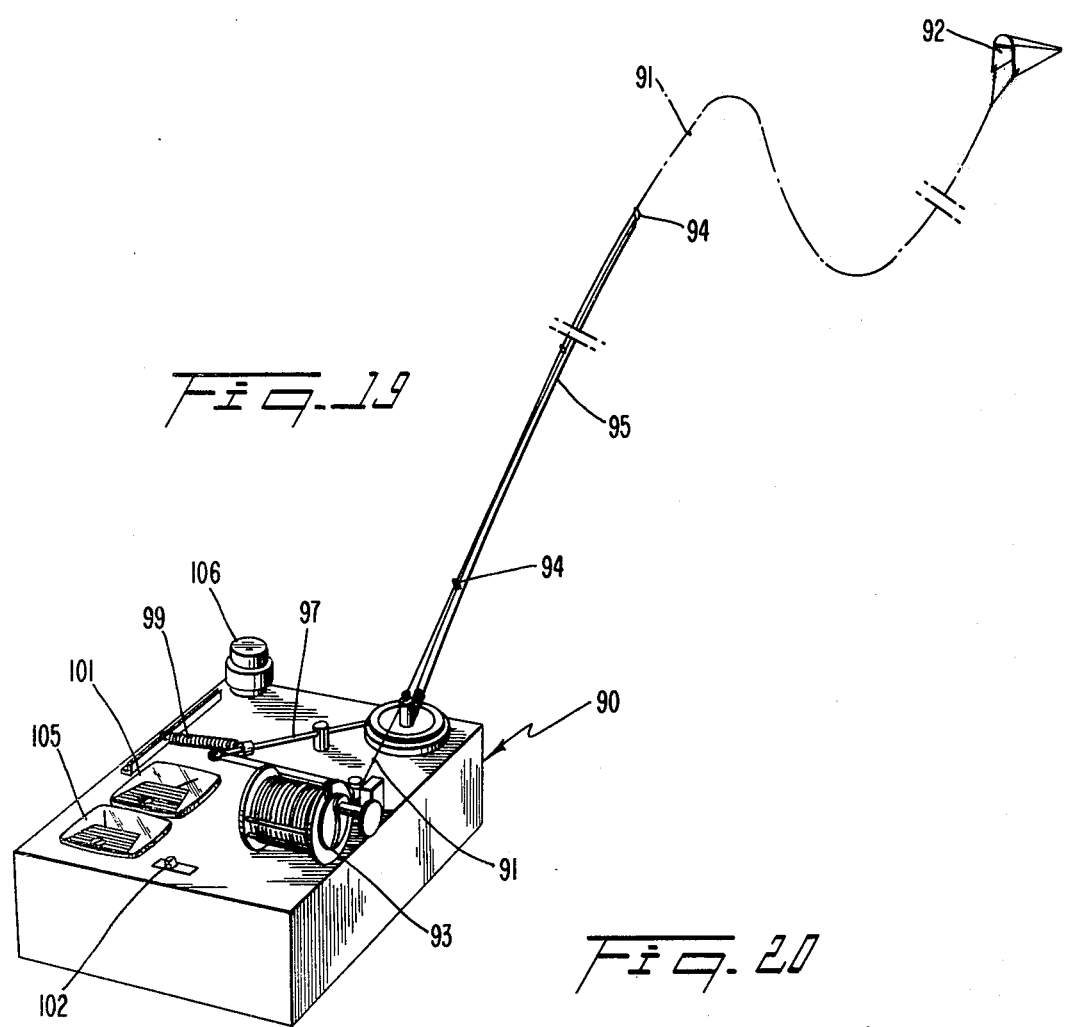
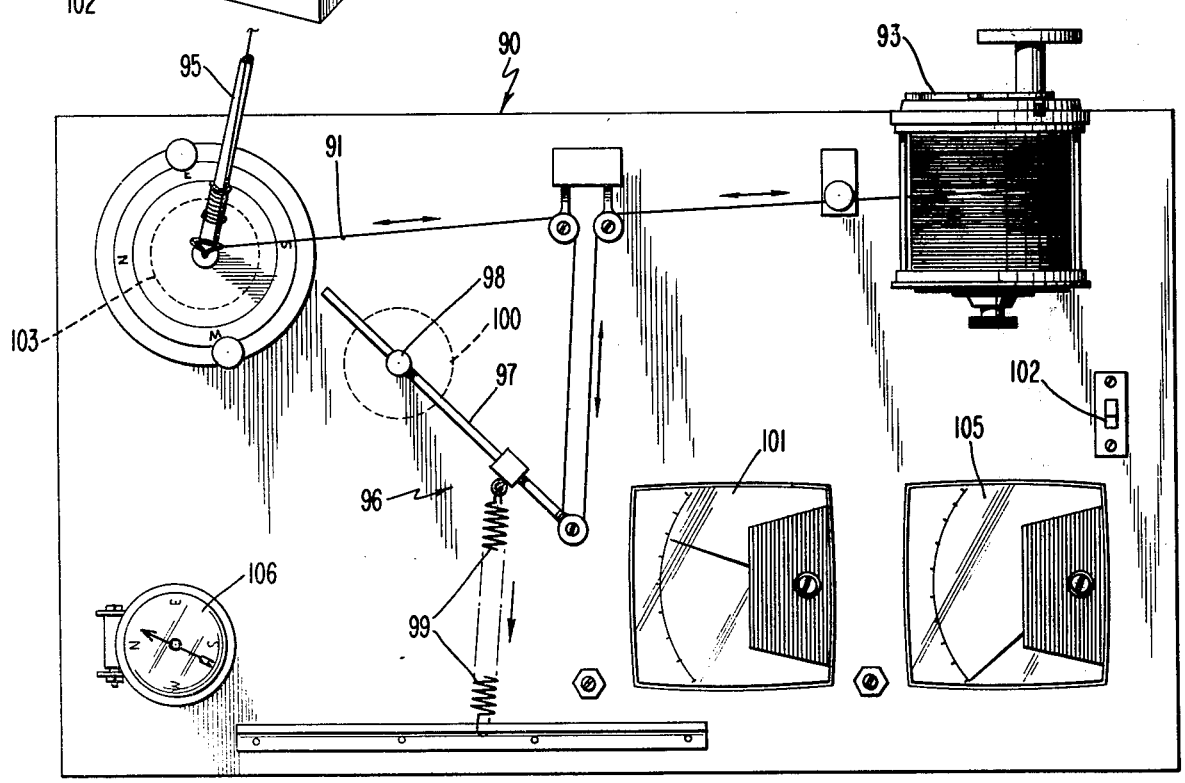

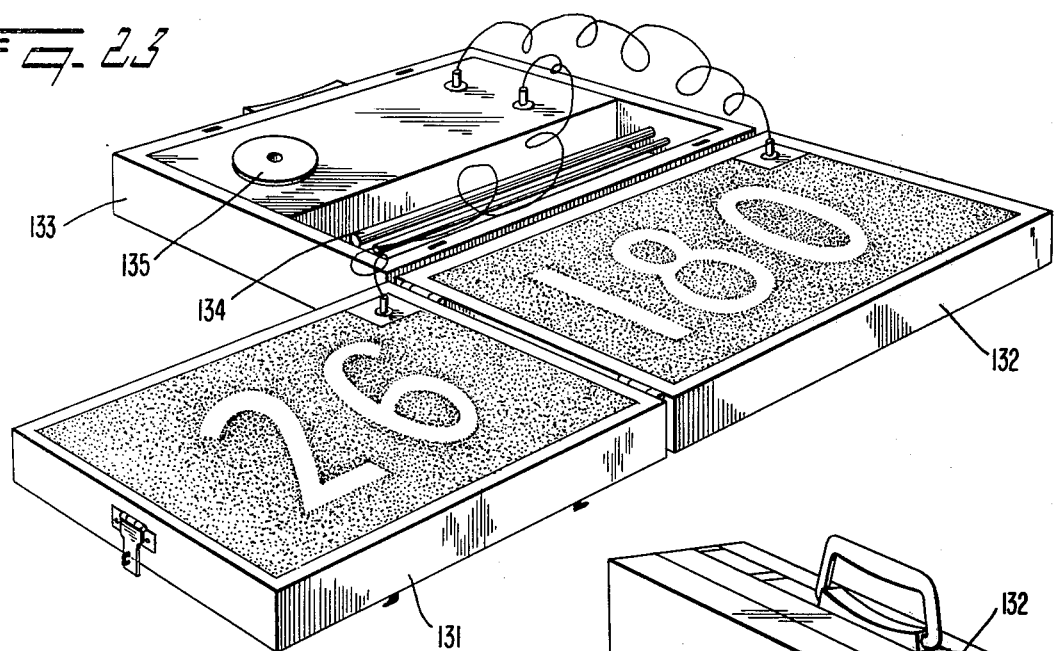
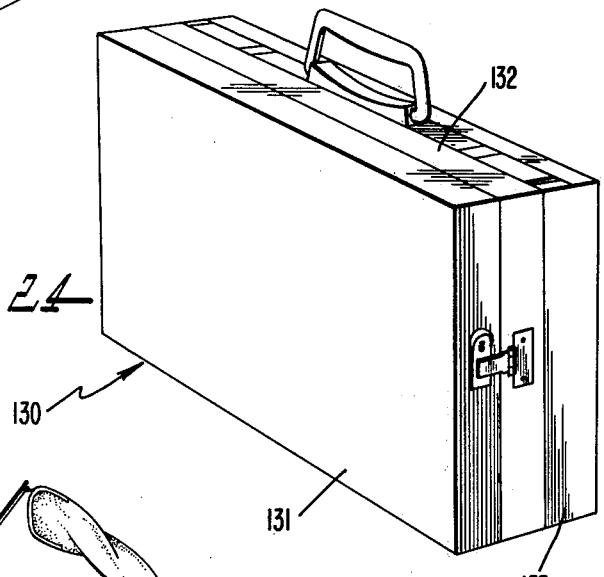
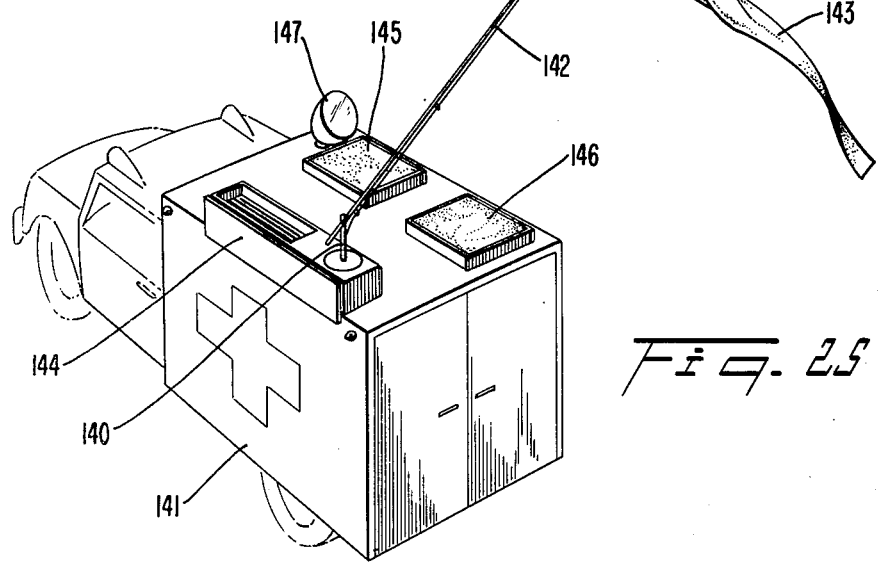

WIND MONITORING ASSEMBLY AND METHOD

STATUS OF THE INVENTION

This application is a continuation-in-part application of my parent application, Ser. No. 674,231 filed Apr. 6, 1976, now U.S. Pat. No. 4,058,010, which parent application is incorporated by reference in its entirety herein.

BACKGROUND OF THE INVENTION

The present invention relates to aerological condition measurement methods and apparatus. More particularly, the present invention is directed to methods and apparatus for continuously monitoring wind conditions such as wind velocity and wind direction at various altitudes and indicating these through visual mechanisms.

Currently, the most scientific way to measure wind velocity is to build a tower, instrument it with anemometers and record. Anemometers measure wind velocities in many different ways. The common spinning cups turn an electric generator. Resistance change with the heat dissipation from a hot-wire anemometer is used to measure the wind velocity. The anemometers must be put into the actual wind so that the velocity may be determined. Many of these towers have been built. Unfortunately, if it is desired to measure wind velocity at another site or altitude, or study flow patterns, a further tower has to be built or the first tower has to be moved. This process is extremely expensive and impractical for many reasons.

The prior art has attempted to determine wind velocity and wind direction through the use of aerostatic devices such as balloons. The French Pat. No. 971,300 discloses a device for aerological soundings. The aerostatic device lifts as a function of the material with which it is inflated. The balloon is tethered to one end of a line that is wound around a drum at the other end thereof. The patentee states that a tractive effort is determined through the use of a dynamometer. While the patentee states that a wind velocity is determinable, no such method of determining this wind velocity is disclosed therein. The tractive effort is said to be due to the upward force of the balloon and, additionally, the wind velocity. The patentee does not disclose how the amount of tractive effort due to the wind velocity is distinguished from the aerostatic lifting force. Furthermore, it has now been found that a balloon acting under aerostatic conditions cannot be operated in wind speeds beyond 20 knots. Such an aerostatic vehicle is completely unstable under high velocity wind conditions. That is, the winds will blow it downwardly and create an impossible situation for measuring wind velocity.

The ballon or aerostatic device has expanding characteristics which are unknown under changing conditions of temperature pressure and air density. The drag on the ballon is proportional to the cube of the area which varies both with altitude and temperature. Thus, it is impossible to calibrate an aerostatic device in conjunction with the line tension determined on the tether line. This new fact as reported in an article published in the Bulletin of the American Meterological Society, Volume 56, No. 9, at page 964, expressly contradicts the teaching of the French patent noted above. At a certain altitude, the aerostatic device or balloon will collapse when it bursts from its internal pressure exceeding the atmospheric pressure which changes with respect to altitude.

The conventional wind sock is used virtually all over the world at airports for the purpose of giving a visual indication of wind direction and velocity. The conventional wind sock has an opening through which the wind blows and expands the sock by an amount depending upon the type of material being used and the size of the wind sock. These materials and sizes provide the disadvantage of not being very sensitive in their response to wind condition changes. The size of the mast and sock itself make it virtually impossible to be placed near the runway where the landing or takeoff is to occur. Very often, the wind condition near the wind sock installation is quite different from that existing near the actual point of takeoff or landing for the aircraft on the runway. The wind sock is not sensitive enough to determine wind change characteristics in operations where there are turbulence producing obstructions and buildings such as in a heliport area.

PURPOSE OF THE INVENTION

The primary object of the invention is to provide a device having known aerodynamic lift/drag flying characteristics which will operate in wind speeds beyond 20 knots without becoming unstable to determine natural wind conditions such as wind velocity and direction.

Another object of the invention is to provide a wind monitoring unit which may be used in airports for the purpose of having greater informational value than the conventional aircraft wind sock.

Another object of the invention is to provide a portable combination which is used to gather aerological data under emergency conditions which may be carried or dropped in remote locations to determine low altitude wind conditions.

A further object of this invention is to provide a method and apparatus for examining wind flow currents around stationary objects such as the ground, buildings and other architectural structures.

A still further object of this invention is to provide a structural combination and a method of monitoring natural wind conditions in a boundary layer located above an inversion layer having a no-wind condition.

Yet another object of this invention is to provide an assembly for visually communicating natural wind conditions at a landing location for a vertical landing and take-off aircraft such as a helicopter.

A still further object of this invention is to provide a portable meterological kit assembly which may be used in an unattended condition while continuously monitoring wind conditions.

Another assembly of the invention monitors natural wind conditions such as wind velocity and direction while the aerodynamic flight vehicle is being deployed upwardly.

SUMMARY OF THE INVENTION

These objects and other advantages are obtained through the use of the assemblies and methods as disclosed and described herein. The basic assembly for monitoring natural wind conditions comprises a flight vehicle having calibrated aerodynamic lift/drag flying characteristics which are substantially unaffected by temperature and pressure changes. The flight vehicle is flown in a natural wind condition at the end of a tether line. The tension force on the line is sensed when the vehicle is flying. Means connected to the tether line indicate the direction of the natural wind into which the vehicle is flying. Heretofore, the prior art has not had the ability to determine wind velocity as a function of the tension force on the tether line for an aerodynamic flight vehicle.

Another inventive feature of the disclosure comprises the combination of the windborne vehicle having known lift/drag characteristics secured at one end of a tether line means. Tether line means is secured at the other end to a ground anchor means for rotative freedom about a vertical axis. Tether line guide means secured to the mast means aligns the mast means with the tether line when the windborne vehicle is in flight. Angle sensing means is effective to measure the azimuth angular displacement of the mast means above the vertical axis with respect to a fixed reference alignment. Tether line tension sensing means measures the tension force on the tether line when the windborne vehicle is in flight. Signals proportional to the angular displacement and the tension force are transmitted to a remote receiving station.

Another inventive feature of the disclosure sets forth the combination of a kite connected at one end to a tether line with a drogue tail means. The drogue tail means has sufficient buoyancy to lift the kite secured to the tether line in a no-wind condition and is spaced from the kite by an amount sufficient to prevent any interference on the flight characteristics of the kite under active wind conditions. The drogue tail means is flexibly secured to the tether line to align downwardly with respect to the kite under active wind conditions. The kite in flight under active wind conditions is effective to override the buoyancy of the drogue tail means.

A specific embodiment of the drogue tail means comprises an inflatable elongated tube having sealed ends filled with a lighter-than-air gas. One end of the tube is secured to the tether line. This particular structural combination is used to monitor natural wind conditions in a natural layer located above an inversion layer having a no-wind condition. The drogue tail means filled with a lighter-than-air fluid medium provides sufficient buoyancy to lift the kite secured to the tether line in a no-wind condition upwardly through the inversion layer to the boundary layer. Once in the active wind condition within the boundary layer, the kite is effective to override the lifting buoyancy of the drogue tail means. The tension force on the tether line is measured when the kite is in the boundary layer. The tension force is coordinated with the kite flying characteristics to determine natural wind velocity.

An assembly having the kite and a drogue tail means flexibly secured to the tether line may be used for determining wind flow currents along the surface of a stationary object. Here the drogue tail means is inflated with a fluid medium effective to provide a neutral density sufficient to balance the weight of the drogue tail means in flight. The kite provides the lift necessary to put the drogue tail means into position for recording the wind flow currents. A still camera, video camera or movie camera may be used to photograph the kite and the diogue tail means in flight to establish the necessary spatial coordinates for determining the wind flow currents.

A further specific aspect of the drogue tail means comprises an elongated inflated tube having minimum drag characteristics and being inflated to conform the shape thereof to the wind currents moving along the outer surface and parallel to the longitudinal axis thereof. The neutral density provided in the drogue tail means allows the lift to be attributed to the aerodynamic flight vehicle.

A further inventive feature of the disclosure comprises an assembly for visually communicating natural wind conditions at a landing location to a vertical landing and take-off aircraft such as a helicopter. Tether mast means are secured to the anchor mast means deployed at the landing location. Visual indicating means are electrically connected to means for monitoring the natural wind condition. The visual indicating means have a structural configuration constructive to visually transmit the natural wind conditions of velocity and direction to altitudes sufficient to be seen and read by the pilot of a landing aircraft. Specific embodiments of this assembly provide for the combination of the several elements in the assembly having a composite structural configuration effective to form a portable kit. Another embodiment provides for this assembly to be secured to a ground vehicle of an emergency type such as an ambulance or rescue squad unit.

A further inventive feature of the disclosure provides a portable meteorological kit assembly having a housing means in which the tether anchor means and tether mast means are secured in the housing. The calibrated aerodynamic flight vehicle is detachably connected for storage and use within the housing and may be deployed at any desired location for effective continuous monitoring of natural wind conditions at varying heights. This includes the use of self-flying flight vehicles attached to tether lines deployed from a spring-biased reel means. The tether mast means and the flight vehicle means are detachably stored in the housing for convenient set up and portability.

A threshold indicator of this invention is designed to be flown along the guide slope of an aircraft with the wind direction and wind velocity to be telemetered to a remote signal receiving station. In its nontelemetered form, an iridescent banner or streamer is tethered to a pole or mast. The wind trailing member or streamer is an easily interpreted visual wind indicator for gliderports, heliports and conventional runways. The pole or mast is tilted at an angle and turns on a permanent bearing. The direction of the mast always agrees with the direction of the streamer or wind trailing element. The threshold indicator may be placed against an appropriate background and located at the end of any runway without causing any danger to the aircraft landing or on takeoff because of its size and frangibility. The indicator provides a positive identification of winds close to the actual area of the touchdown or takeoff. The long tail feature of the threshold indicator of this invention provides an extremely accurate determination of the wind magnitude and gust spectrum wherever it is installed. It is extremely responsive to changing wind conditions and particularly useful in areas where there are turbulence producing obstructions and buildings such as in a heliport area.

Velocity computational means may be used in combination with any of the tension measuring mechanisms to coordinate the line tension with the aerodynamic lift/drag characteristics of the flight vehicle thereby determining the velocity of the wind which sustains the vehicle in flight. Altitude computational means is used in combination with vertical repose angle sensing means to coordinate the amount of line deployed from a reel with the vertical repose angular displacement to determine the flight altitude of the vehicle. Each of the wind velocity characteristics may be indicated on a digital display readout, a continuous recorder or any other type of recorder of any size.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is an elevational view of an assembly made in accordance with this invention;

FIG. 2 is a fragmentary view partially in section of the assembly in FIG. 1;

FIG. 3 is a perspective view of a flight vehicle used with the assembly made in accordance with this invention;

FIG. 4 is a plan view of a display instrument used in combination with the assembly made in accordance with this invention;

FIG. 5 is a calibration chart for the aerodynamic lift/drag characteristics of a flight vehicle used with the assembly of this invention;

FIG. 6 is a fragmentary view of a tether mast used with another embodiment of the invention;

FIG. 7 is a fragmentary view of a further embodiment of a tether mast made in accordance with this invention;

FIG. 8 is a fragmentary view of a further embodiment of the invention under no-wind conditions;

FIG. 9 is a fragmentary elevational view of the embodiment of FIG. 8 under active wind conditions;

FIG. 10 is a perspective diagrammatic view of a further assembly made in accordance with this invention;

FIG. 12 is a perspective view of a portable aerological assembly made in accordance with this invention;

FIG. 13 is a fragmentary perspective view of a further embodiment of a tether mast as shown in FIG. 12;

FIG. 16 is a fragmentary view partially in section of the device of FIG. 12;

FIG. 17 is an electrical circuit diagram showing the wind direction meter circuitry for the assembly of FIG. 12;

FIG. 18 is an electrical circuit diagram showing the velocity meter circuitry for the assembly of FIG. 12;

FIG. 19 is a perspective view of a further embodiment of a portable kit assembly made in accordance with this invention;

FIG. 20 is a fragmentry top-plan view of the assembly as shown in FIG. 19;

FIG. 23 is a perspective view of a portable kit assembly in operational deployment for visually communicating natural wind conditions at a landing location to a vertical landing and take-off aircraft;

FIG. 24 is a perspective view of the portable kit assembly of FIG. 23 in its stowed condition;

FIG. 25 is a perspective view of a further embodiment of the assembly as shown combined with an emergency land vehicle.

DESCRIPTION OF SPECIFIC EMBODIMENTS

Figure 11:
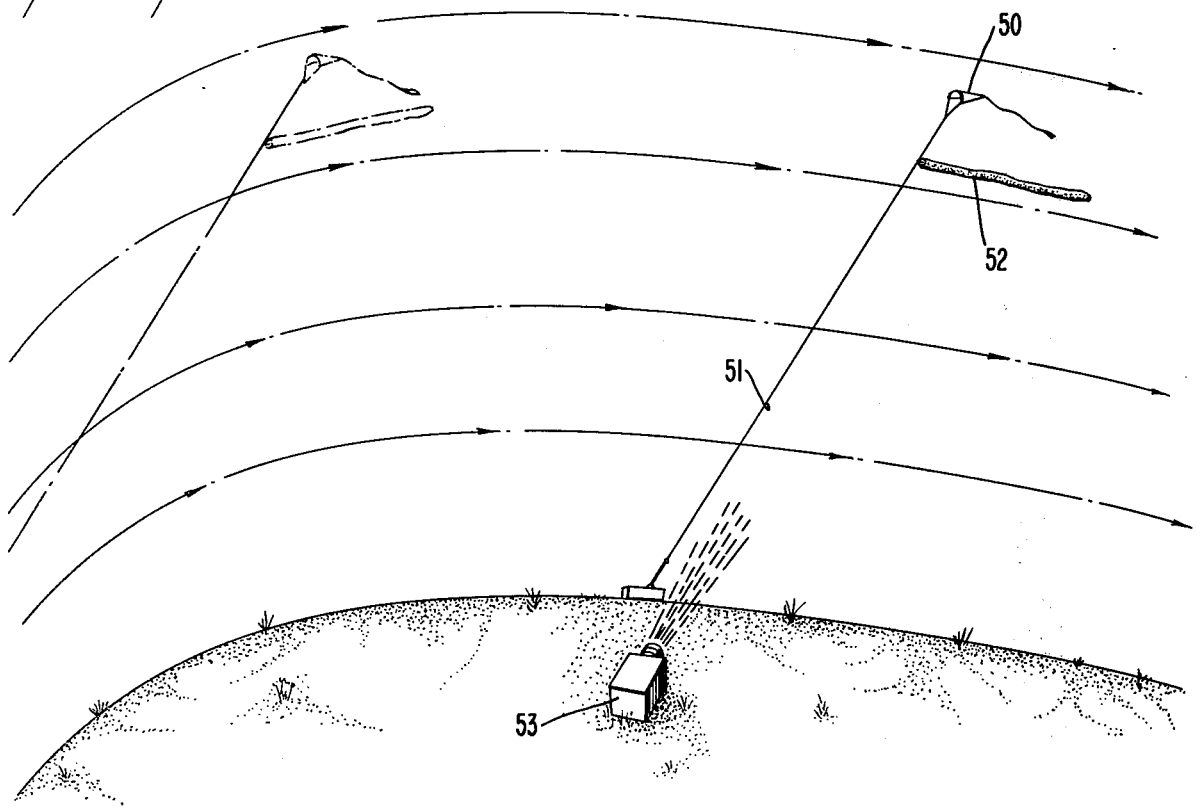
FIG. 11 is a perspective diagrammatic view showing a further use of the embodiment of an assembly shown in FIG. 10.
Figure 11:
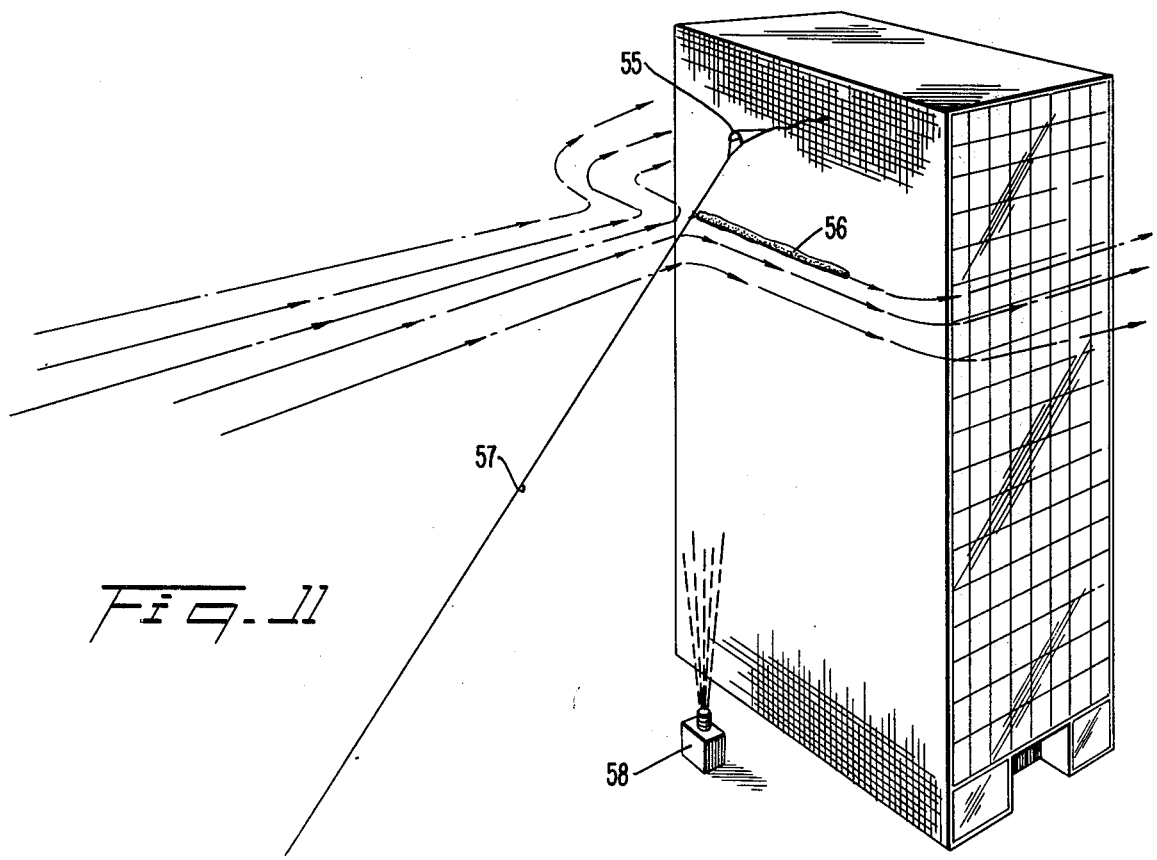

More specifically, referring to the drawings, FIG. 1 shows an assembly, generally designated 10, constituting a wind-threshold indicator. A banner 11 is connected at one end of a tether line 12 which is secured to a mast means 13 by eyelets 21. Thus, the tether line 12 is aligned with the mast 13 when the banner or windborne vehicle 11 is under active wind conditions. Mast 13 is mounted via pin 15 on rotating member 16 of the ground anchor member 14 which is fixedly located in the ground by any suitable means. Member 16 rotates about the vertical axis of the ground anchor member 14.

Tether line 12 is deployed from a take-up reel 17. A sensing element 18 is attached to the tether line 12 and moves longitudinally with respect to line 12 when a tension force is applied by virtue of the drag on the banner 11 under active wind conditions. The lift/drag characteristics of banner 11 have been calibrated. The sensing element 18 operates in conjunction with the linear potentiometer 19 to transmit a signal proportional to the amount of tension force to a coordinating mechanism 20. The tension force is coordinated with the lift/drag flying characteristics of banner 11 to determine the natural wind velocity.

A second potentiometer 22 is attached to a rotatably mounted member 23 fixedly connected to the rotating support member 16 at the top of the anchor member 14. The degree of rotation of support member 16 is thus sensed to measure the azimuth angular displacement of the mast 13 about the vertical axis of the anchor member 14 constituting a fixed reference alignment. A signal is transmitted to the coordinating mechanism 20 which is proportional to the azimuth angular displacement. This latter signal will constitute a reading of the azimuth wind direction.

The information which is sent to the coordinating mechanism 20 may then be telemetered to a remote receiving station within an airport terminal or within the aircraft itself. The device 25 is mounted in the instrument panel and continuously displays the information telemetered from the assembly 10 to show the wind direction via indicator 26 or the wind velocity via indicator 27. The technology for telemetering such information from the coordinating mechanism 20 to a remote receiving station is conventional.

The banner 11 is an iridescent streamer about 20 feet long and the mast 13 may be a fiberglass pole about 20 to 25 feet long. In its nontelemetered form, the threshold indicator 10 is easily interpreted visually to obtain an indication of the wind for gliderports, heliports and conventional runways. The direction of the pole always agrees with the direction of the iridescent streamer or banner 11. The fiberglass pole is tilted at an angle and turns on a permanent bearing. The lift/drag characteristics of the banner for use in the telemetered form may be determined either in wind tunnel tests or by car towing tests. With an omnidirectional 360° mounting system for the mast 13, accurate and rapid response to wind gusts are available both for direction and wind speed. It has been found much more accurate than the conventional wind sock because it does give wind direction at times when there are very changeable conditions. This is true even at times when little wind is present. The correct wind indication right at the touchdown point on the aircraft runway is a significant advantage over existing threshold indicators.

The embodiment of the assembly 10 as shown in FIG. 1 shows a windborne vehicle or banner 11 as a wind direction trailing element disposed at a fixed location on the tether mast 13. The assembly of FIG. 1 is now useful particularly on small airports in the hours of darkness when the continuous monitoring of the wind conditions can be telemetered directly to the aircraft. This telemetry may take place even though the airport itself is extremely small and unattended. The assembly may be lighted in either its telemetered or nontelemetered form to give a visual threshold indicator.

A further embodiment of a windborne kite, generally designated 30, shown in FIG. 3, may be used in place of banner 11. Kite 30 is of an extremely simple design and has stable aerodynamic flight characteristics beyond a 40 mph wind velocity as represented graphically by the velocity-lift resultant calibration curve of FIG. 5. This curve represents the performance of kite 30 which is composed of a 4 mil polyethylene material. The channel link 1 is 18 inches, a channel arc is 13 inches, the leading panel edge b is 9 inches, and the trailing panel edge c is 15 inches. Channel chines 31 are rigid dowel members secured to the polyethylene skin of kite 30. The tether bridle 32 is attached to the tether line 33 and to the respective kite side panels. U.S. Pat. No. 3,767,145 sets forth a more complete disclosure of kite 30. The manner of using this prior art kite is completely new and unexpected and constitutes a patentable feature of this invention.

Wind tunnel tests have shown that the kite 30 can be flown at least to 45 knots. The velocity-tension force data fit an exponential power equation $Y = a \cdot x^b$ where X is wind velocity in knots and Y is a total line tension in pounds (see Table I).

TABLE I $Y = a \cdot x^b$ IS A POWER FUNCTION. THE RESULTS OF A LEAST-SQUARES FIT OF ITS LINEAR TRANSFORM (SORTED IN ORDER OF ASCENDING VALUES OF X) ARE AS FOLLOWS:

| X-ACTUAL | Y-ACTUAL | Y-CALC | PCT DIFFER |
|----------|----------|---------|------------|
| 12.09 | .525 | .529895 | −.9 |
| 18.84 | 1.292 | 1.26434 | 2.1 |
| 24.96 | 2.169 | 2.19458 | −1.1 |
| 30.23 | 3.242 | 3.19479 | 1.4 |
| 34.32 | 3.984 | 4.0971 | −2.7 |
| 38.05 | 5.074 | 5.01552 | 1.1 |
| 41.92 | 6.071 | 6.06431 | .1 |

The graph of the data is smooth until structural failure of the sensing mechanism occurs at over 40 knots (see FIG. 5). Further prototypes of the kite have been car-towed with good stability at over 70 mph.

Studies have shown that the line catenary introduces at most 10% absolute altitude error. Corrections based upon line diameter, drag, weight and wind velocity can be applied to reduce the altitude error to a minimum. While it is possible to obtain a computer analysis, it is presently assumed that an arc is the worst cause of the catenary. The wind tunnel tests have shown that the line vector to the kite 30 while in flight is 55° at 15 knots which rises to only 58° at 40 knots. The maximum catenary error is less than 10% with the catenary base angles of less than 44°. These catenaries may be reduced by using appropriate line diameters and weight.

The kite 30 may be deployed from the end of a 20 foot rotating pole such as shown in FIG. 1. When the surface wind exceeds 7 knots, kite 30 swings upwardly from its hanging position in a dead calm and flies stably at the end of the rotating pole 13. A line tension sensing mechanism is actuated and deploys the kite 30 at a rate sufficient to maintain flying tension to a predetermined altitude. If the wind dies down, the tension lessens and the kite 30 is retracted automatically so that it is ready for deployment when the wind picks up again. With this type system, it is possible to provide a continuous measurement of wind directions and velocities at any desired location. When the kite 30 is deployed below and outside the glide slope and localizer paths, there is no hazard to aircraft if they were to strike on approach or departure.

The kite design is by no means exclusive. Any flight vehicle having aerodynamic lift/flight characteristics which are stable in winds which would have an adverse affect upon flying aircraft are suitable for use in conjunction with the assembly of this invention. Lighter-than-air ballons do not have the aerodynamic lift/flight characteristics required to achieve the desired results because they function in accordance with aerostatic principles. This has already been discussed above.

Another inventive feature disclosed herein is shown in FIGS. 8 and 9. A drogue tail 35 is connected to the tether line 38 via the line 36 and kite 37. The combination is shown in a no-wind condition in FIG. 8 and in an active wind condition in FIG. 9. The drogue tail 35 has sufficient buoyancy to lift the kite 37 secured to the tether line 38 in a no-wind condition as shown in FIG. 8. Here the drogue tail 35 stands vertically and will lift the kite through an inversion layer having a no-wind condition and into a boundary layer where there are natural wind conditions.

Drogue tail 35 is connected to tether line 38 at a spaced distance from the kite 37 sufficient to prevent interference with kite 37 during flight. In this instance, drogue tail 35 is filled with a lighter-than-air fluid medium to provide the sufficient buoyancy to lift the kite 37 as noted. The tether line 38 is deployed in a no-wind condition under the lifting influence of the drogue tail 35 through the inversion layer until kite 37 enters the boundary layer. The drogue tail 35 is flexibly secured to the tether line 38 to align downwind with respect to the kite 37 under active wind conditions as shown in FIG. 9. While in flight under active wind conditions in the boundary layer, the kite 37 is effective to override the lifting buoyancy of the drogue tail 35. Thus, the tension force on the tether line 38 may be measured when the kite is in the boundary layer without having any lifting influence on the drogue 35.

In this specific embodiment, the drogue tail 35 is an elongated tube composed of point 0.0005 inch aluminized mylar a diameter of 8 inches and being 15 feet long. The tube is inflated with hydrogen or helium and will lift the kite and tether line upwardly. If the kite hangs motionless, calm prevails. If the kite flips over, flies and a tension force is recorded, then an upper layer wind of known altitude, direction and velocity exists which is monitored to the ground installation. The angular displacement of tether line 38 may be measured within the vertical plane to determine the vertical repose angle of kite 37. Further, the azimuth angular displacement may be measured with respect to the tether line.

The drogue tail 35 comprises an inflatable elongated tube that is sealed at both ends. It is designed to have a minimum amount of drag once it has entered into active wind conditions. As soon as the combination of the drogue tail 35 and kite 37 enter the active wind conditions, the drogue tail 35 will assume the horizontal position as shown in FIG. 9. The kite 37 has calibrated aerodynamic lift/drag flying characteristics which are substantially unaffected by temperature and pressure changes. Thus, the tension force measured on the tether line 38 may be combined with the lift/drag characteristics of kite 37 by wind velocity computational means to determine the velocity of the wind which sustains the kite 37 in flight. The drogue tail 35 may be aluminized for high radar visibility to effect another exemplary utility thereof. The tension line 36 may be calibrated to provide a release of the drogue tail 35 at high wind velocities.

Further embodiments of the ground anchor means and tether mast means are shown in FIGS. 6 and 7. The moment force is applied by the tether line 12, the tether mast 13 will turn the assembly into a downwind alignment with the direction of wind sustaining the flight vehicle. The line 12 may be attached to a reel having a line counting mechanism associated therewith. When the vertical angular displacement of the tether line is measured within a vertical plane with respect to a fixed reference alignment, the vertical repose angle of the flight vehicle is determined. The vertical elevation of the flight vehicle may then be obtained by simple trigonometric calculation from the two measured parameters; namely, the vertical repose angle and the amount of line deployed.

As shown in FIG. 8, the vertical repose angle may be measured through the use of a rotary potentiometer 40 or similar device for signalling an angular displacement. The potentiometer 40 is mounted on the rotating standard 41 about a journal 42. As the tether mast 43 is rotated from the upright, no-wind position, the vertically displaced repose angle is sensed by the potentiometer 40. An appropriate signal is conducted via electrical leads 44 to a transmit/receive console (not shown).

A further embodiment for vertical angular measurement is shown in FIG. 9. The vertically pivoting tether mast 43 is replaced by a rigid pole 45 having a fixed angle joint 46. A vertical angle sensing potentiometer 47 is secured to pole 45 at the upper, distal end of the joint 46. A line alignment guide 48 is secured to the rotative element of potentiometer 47. Tether line 12 is routed directly from the tension measuring device (not shown) to the line alignment guide 48 to avoid contact with additional mast elements in freezing weather.

Once the described embodiments are in place, the flight vehicles, whether kites or banners, will hang limp from the vertically erected tether mast when there is dead calm air or no-wind conditions. However, when sufficient wind arises, the flight vehicle having aerodynamic lift characteristics will automatically activate itself while disposed at the end of the tether mast. When the tether line 12 is attached to a reel, the kite becomes self-flying under active wind conditions and will be deployed from the tether mast. It is possible to have an unattended, self-flying instrument which will monitor prevailing wind conditions automatically. While the flight vehicle is flying under active wind conditions, if these wind conditions die down, the reel would be automatically reeled inwardly to the end of the tether mast. The reel may be spring-biased or it may be set automatically as fully described in my earlier patent application which has been expressly incorporated by reference herein as noted above.

FIGS. 10 and 11 disclose a method and apparatus for determining wind flow currents along the surface of a stationary object. The stationary object in FIG. 10 is the ground. A kite 50 is connected at one end of a tether line 51. A drogue tail 52 is flexibly secured to the tether line 51 a spaced distance from the kite sufficient to prevent interference on the flight characteristics of kite 50 under active wind conditions. Drogue tail 52 is secured to align downwardly with respect to kite 50 under active wind conditions. Drogue tail 52 is inflated with a fluid medium effective to provide a neutral density sufficient to balance the weight of the drogue tail.

Kite 50 has calibrated lift/drag flying characteristics that are substantially unaffected by temperature and pressure changes. It is flown in the wind at a particular location along the ground as shown in FIG. 10. The restraint force is measured at the end of the tether line 51 and coordinated with the kite flying characteristics to determine the natural wind velocity thereof. The position of drogue tail 52 is recorded during the flying step to determine the wind current flow at that particular location. A camera 53 is used to effect the recording step in this embodiment. Thus, flying kite 50 and drogue tail 52 are photographed while at any one particular location. The complete profile of the wind currents may be determined by recording the position of the drogue tail 52 at a plurality of locations along the surface of the stationary object. Another position for a kite recording location is shown in phantom in FIG. 10.

The stationary object in FIG. 11 is an architectural structure; namely, an office building. Here, kite 55 is flown at the end of the tether line 57 with drogue tail 56 being flexibly mounted to follow the currents of wind around the outer surface of the building. A camera 58 is used to record the various positions of the tail. Tether line 57 is connected to a mechanism for measuring tension and obtaining velocity therefrom in accordance with the invention.

A portable meteorological kit assembly, generally designated 60, includes a housing having a top portion 61 and a bottom portion 62. See FIGS. 12 through 18. Tether mast 63 is detachably secured to the tether anchor mechanism 64. Kite 65 constitutes a flight vehicle having calibrated aerodynamic lift/drag characteristics which are substantially unaffected by temperature and pressure changes. Tether line 66 is detachably secured at one end thereof to the kite 65. Tether line guide members 67 are secured to the mast 63 to align the mast 63 with the tether line 66 when the kite 65 is in flight. The other end of tether line 66 is stored on the antibacklash reel 68 as shown in FIG. 16.

Tether line 66 passes around the disc 70 which rotates the potentiometer 71. This mechanism constitutes a means disposed in the housing 62 for sensing the tension force on the tether line 66 when the kite 65 is flying.

Tether mast 63 is flexibly secured to the shaft 72 disposed within the housing 62. As the mast 63 rotates about the vertical axis of the shaft 72, the gear 73 rotates the measuring potentiometer 74. The degree of rotation of the mast 63 about the vertical axis of the shaft 72 is thus indicative of the azimuth wind direction in which the kite 65 is flying.

The circuit diagram in FIG. 17 represents the 360° potentiometer 74 in combination with a calibrating potentiometer 75 for reading off the direction on a meter 76. The circuit diagram in FIG. 18 shows the potentiometer 71 used in combination with the trimmer potentiometer 77 for reading off the velocity directly on the meter 78. The meters 76 and 78 may correspond to the digital readout display panels 81 and 82 if desired.

Figure 14:
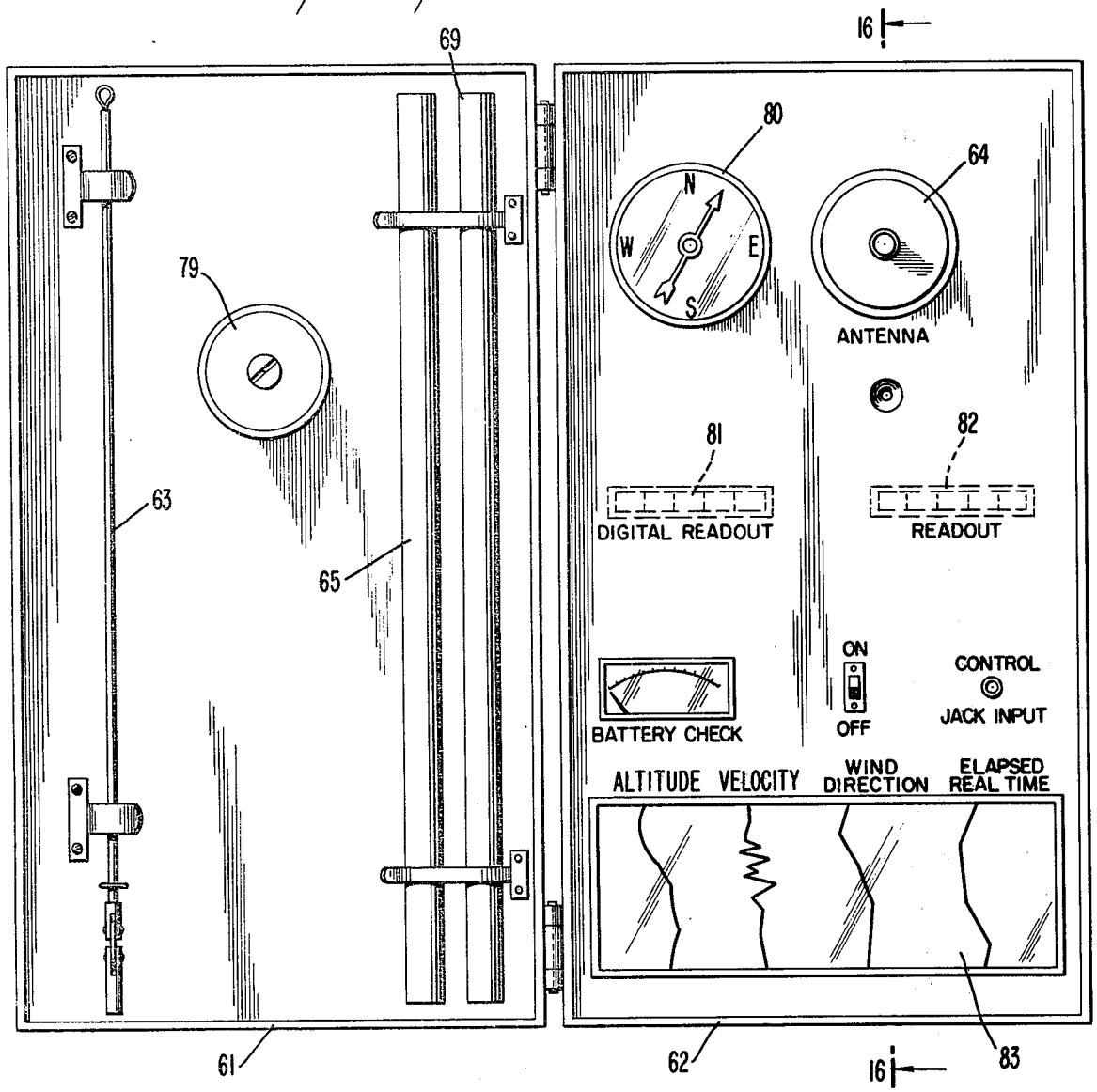
FIG. 14 is a top-plan view of the kit assembly as shown in FIG. 12 in the stowed condition.
Figure 15:
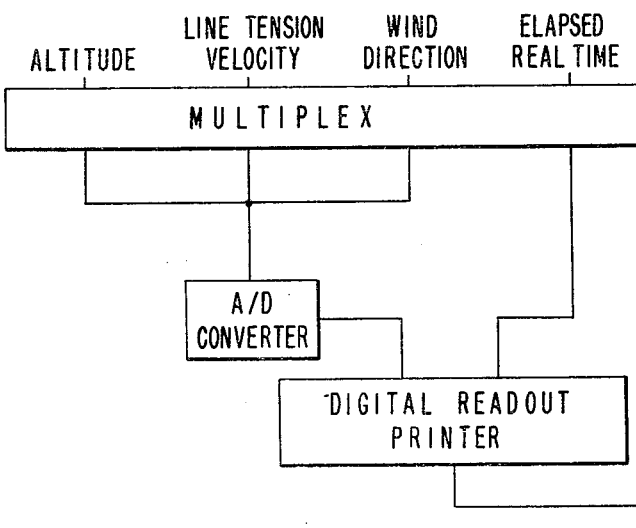
FIG. 15 is a diagrammatic circuit of the assembly of FIG. 12.
Figure 21:
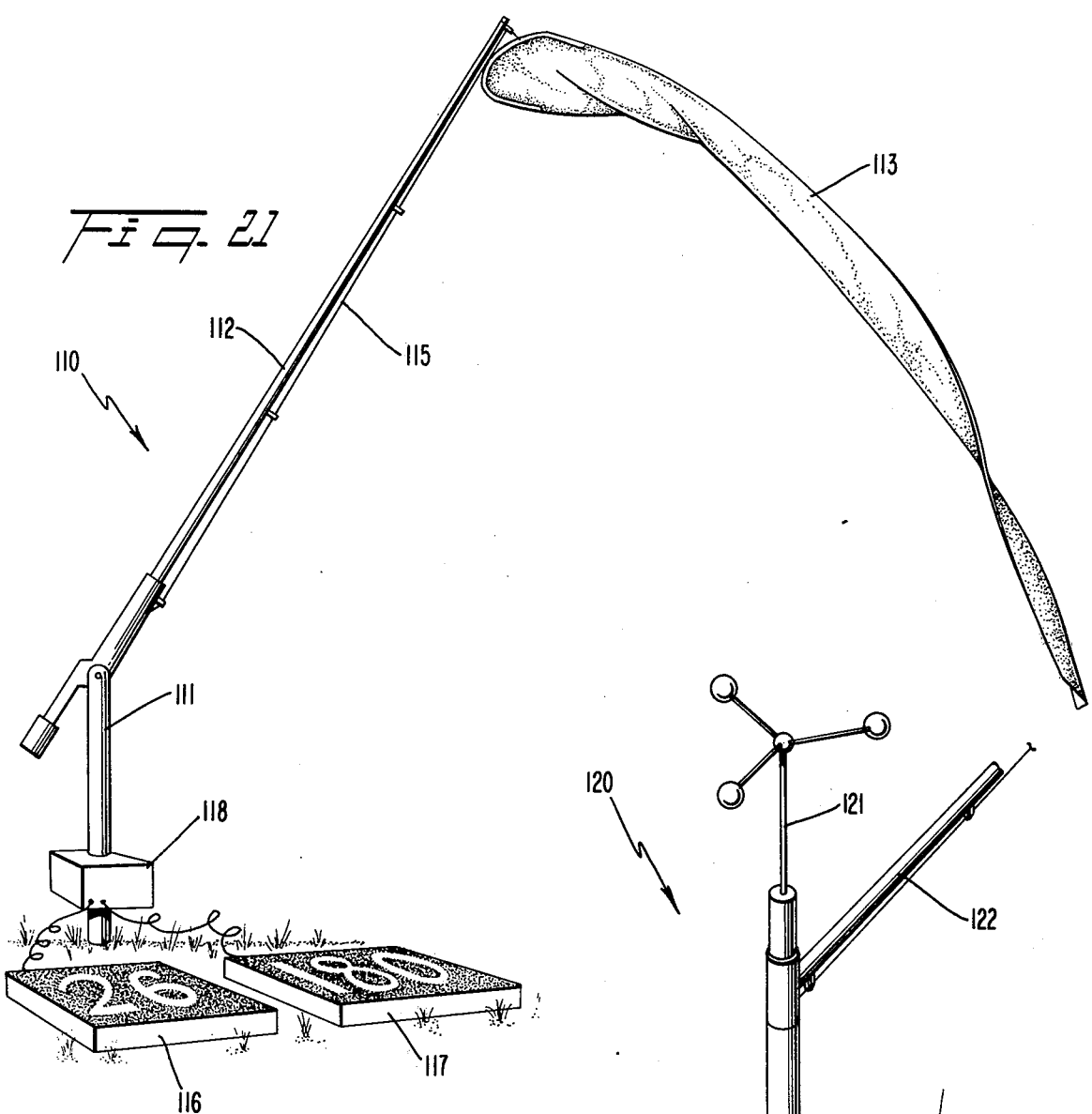
FIG. 21 is a perspective view of an assembly made in accordance with this invention for visually communicating natural wind conditions at a landing location.

Kite 65, an extra reel 79 and mast 63 may be stowed in the top portion 61 of the housing as shown in FIG. 14. An extra kite 69 may be provided as a precautionary measure. The magnetic direction will be read off directly from the compass 80 as disposed within the bottom housing portion 62. The readout display means 81 and 82 may be used to visually indicate velocity, wind direction, altitude or elapsed real time. These various natural wind conditions may be recorded continuously on a continuous recorder 83 as shown. The diagrammatic circuit in FIG. 15 shows this information being multiplexed and an analog/digital converter being used to obtain a digital readout of the information being recorded on recorder 83. This digital readout may be telemetered to a remote station, to an aircraft or to any desired spot where the information may be found useful.

The altitude of the kite would be determined through the use of a mast configuration as shown in FIG. 13. Here the vertical repose angle would be sensed along with the determination of how much line was deployed from the reel 85. The angle of the tether mast 86 is determined and through a simple trigonometric calculation, the specific height above the earth is determined and transmitted to the digital readout 81, the recorder 83 or both. The manner of recording this information is most useful where the natural wind conditions are deemed necessary at various heights upon a delimited amount of surface area.

A control unit 88 is used to deploy the kite 65 either up or down in direct response to the signal given. This field instrument is designed to deploy the tether line up to any desired altitude. Devices have already been used to deploy the line up to 1000 feet. The wind conditions may be continuously recorded as the line is deployed.

A further embodiment of a meteorological kit assembly is shown in FIGS. 19 and 20. The kit assembly 90 includes a tether line 91 secured at one end to a kite 92. The other end of tether line 91 is rotatably stored on the reel 93. Line guide members 94 secured to mast 95 align the mast 95 with the tether line 91 when the kite 92 is in flight. The flying tension force sensing mechanism 96 includes a lever arm 97 which pivots around the axis 98. Spring 99 is used to bias the lever arm 97 in the direction shown. A potentiometer 100 registers the amount of movement of the lever arm 97 depending upon the amount of tension in line 91 which is looped around the end of the element 97 as shown. The signal is transmitted through the appropriate circuitry to the dial 101 on which the velocity is visually indicated.

The mast 95 rotates around the vertical axis about which the 360° potentiometer 103 is disposed. As the mast 95 rotates as noted, the signal is transmitted from the potentiometer 103 to the dial 105 on which it is visually indicated. Switch 102 is used to automatically switch on and off the separate readout meters 101 and 105 depending upon the desire to read either the wind velocity or wind direction, respectively. The compass 106 is mounted at one place on the housing 89 to determine the magnetic bearing.

The instrumentation for measuring the line tension from the threshold banner or kite may be transmitted either to a remote teller location or directly to the aircraft. A small 0.3 watt FM transmitter is, for example, on 72.320 Mhz. The transmitter has two channels. One channel transmits wind direction from a 360° potentiometer 103 and the tension force is obtained from the lever arm 97 via the potentiometer 100. The airborne receiver may consist of a battery pack, receiver, decoder and servo mechanisms necessary to visually indicate the desired direction and velocity. See the type of instrumentation already discussed with respect to FIG. 4. Once a transmitter frequency is approved for all airports, then the wind conditions may be automatically monitored from the threshold wind indicator whether the airport is tower operated or completely unattended. The wind information would be available to all aircraft and have a great safety advance over the present system of landing aircraft based upon wind information obtained from a field anemometer such as a wind sock which may be located many hundreds of yards away from the actual approach path of the aircraft.

Referring to FIGS. 21 through 25, several embodiments of assemblies for visually communicating natural wind conditions at a landing location for a vertical landing and takeoff aircraft are shown. An assembly, generally designated 110, is fixed in the ground. A tether anchor member 111 stands vertically and a tether mast 112 is detachably secured thereto. A wind direction trailing element 113 is disposed at the end of the tether mast 112 to visually indicate the wind direction. One end of tether line 115 is connected to the banner or trailing element 113 and the other end is connected to a line tension sensing mechanism (not shown). The visual indicating panels 116 and 117 are electrically connected to the coordinating mechanism 118 for visually transmitting the natural wind conditions of velocity and direction to an altitude sufficient to be seen and read by the pilot of a landing aircraft. The velocity is computed and coordinated via mechanisms as per earlier embodiments of the disclosed invention. The azimuth wind direction is determined in the same manner as the earlier embodiments.

Figure 22:
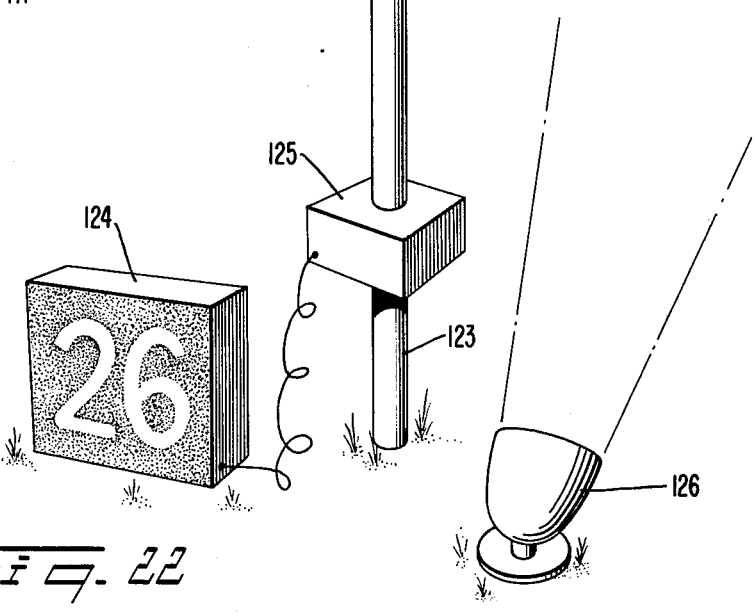
FIG. 22 is a perspective view of a further embodiment of an assembly as shown in FIG. 21.

As shown in FIG. 22, the wind velocity is determined by assembly 120 having a standard anemometer 121 rather than measuring tension force on the tether line. The visual disposition of the banner or trailing element 113 would constitute the visual indication of the wind direction. A digital readout device 124 displays wind velocity obtained via computational mechanism 125 that is electrically connected to anemometer 121. A light 126 illuminates the banner during darkness.

As an alternative to the use of a digital readout device 124, a strobe light may be used. The standard strobe light is slaved to the anemometer 121 through the use of a low-maintenance solid state circuit. The strobe light may be photoelectrically activated having high intensity during the day and low intensity at night. This is particularly useful in confined-quarters operations such as at a heliport.

Power to the lights may be continuous A.C. current or battery current. Power may be taken directly off the runway lights. The circuitry can operate the strobe light in flash cues. Table II illustrates a continuing flash sequence that indicates measured wind velocity plus or minus five knots.

TABLE II

| F = Flash | --- = long pause | -- = short pause |
|---|---|---|
| If wind velocity is: | Light will flash in sequence below. | |
| 5– 9 knots | ---F---F---F---F---F---F-- | |
| 10–14 knots | ---F-F---F-F---F-F---F-F--- | |
| 15–19 knots | ---F-F-F---F-F-F---F-F-F---F-F-F | |
| 20–24 knots | ---F-F-F-F---F-F-F-F---F-F-F-F--- | |

TABLE II-continued

| F = Flash | --- = long pause | - = short pause |
|---|---|---|
| If wind velocity is: | Light will flash in sequence below. | |
| 25–29 knots | ---F-F-F-F-F---F-F-F-F-F---F-F-F-F-F | |
| 30 knots up | ---F-F-F-F-F-F---F-F-F-F-F-F--- | |

The lighted display of velocity used with the assembly 120 is particularly valuable at landing sites not equipped with ground-to-air communications or very busy airports having cluttered unicom frequencies. The pilot can, by directly reading either a digital display or counting flasher, arrive at a measured wind vector at his intended landing site.

To facilitate a visual determination of the direction of the wind, a cone or cylindrically-shaped body is secured at the base of the rotating tether mast 122. The body is painted in two iridescent colors such as red and green to coordinate with upwind and downwind directions.

The embodiment as shown in FIGS. 23 and 24 provides a combination of several elements in an assembly constituting a composite structural configuration effective to form a portable kit 130 as shown in a closed position in FIG. 24. As shown in an open position, display panels 131 and 132 are electrically connected to appropriate outlets disposed in the case 133. The mast 134 may be stowed or detachably secured to the anchor means 135. Tether anchor, tether mast, wind and velocity monitoring means and visual indicating means are all detachably connected with respect to each other to form a kit as noted.

The embodiment as shown in FIG. 25 shows the tether anchor mechanism 140 secured to a ground emergency vehicle 141. Mast 142 and banner 143 may be stowed automatically in the container 144 disposed on the roof of the vehicle 141. The display panels 145 and 146 may be disposed on the top of the vehicle to allow the visual indication of wind velocity and wind direction. Thus, a vertical landing aircraft such as a helicopter landing at an emergency depolyment area instantly has the desired wind information. A light 147 may be used to illuminate the banner 143 if necessary. The anchor 140 and mast 142 may be deployed automatically through the use of a hydraulic system which is well known in the prior art useful in raising and lowering antenna members in ground vehicles.

While the wind monitoring assembly and method have been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. The combination comprising:
   (a) a kite connected at one end to a tether line,
   (b) a drogue tail means connected to the tether line and having sufficient buoyancy to lift the kite secured to the tether line in a no-wind condition,
   (c) said drogue tail means being spaced from the kite by an amount sufficient to prevent any interference on the flight characteristics of the kite under active wind conditions,
   (d) said drogue tail means being flexibly secured to the tether line to align downwardly with respect to the kite under active wind conditions,
   (e) said kite in flight under active wind conditions being effective to override the buoyancy of the drogue tail means,
   (f) said kite having a calibrated aerodynamic lift/drag flying characteristics,
   (g) said aerodynamic characteristics being substantially unaffected by temperature and pressure changes,
   (h) sensing means measures tension force on the tether line when the kite is flying,
   (i) wind velocity computational means is connected to the tether line for combining the tension force on the tether line with the lift/drag characteristics of the kite to determine the velocity of the wind which sustains the kite in flight.

2. The combination comprising:
   (a) a kite connected at one end to a tether line,
   (b) a drogue tail means connected to the tether line and having sufficient buoyancy to lift the kite secured to the tether line in a no-wind condition,
   (c) said drogue tail means being spaced from the kite by an amount sufficient to prevent any interference on the flight characteristics of the kite under active wind conditions,
   (d) said drogue tail means being flexibly secured to the tether line to align downwardly with respect to the kite under active wind conditions,
   (e) said kite in flight under active wind conditions being effective to override the buoyancy of the drogue tail means,
   (f) said kite having a calibrated aerodynamic lift/drag flying characteristics,
   (g) said aerodynamic characteristics being substantially unaffected by temperature and pressure changes,
   (h) means is connected to the line for indicating the direction of the natural wind in which the kite is flying.

3. A method of monitoring natural wind conditions in a boundary layer located above an inversion layer having a no-wind condition, said method comprising the steps of:
   (a) providing a kite having calibrated lift/drag flying characteristics that are substantially unaffected by temperature and pressure changes,
   (b) securing said kite to the end of a tether line,
   (c) connecting drogue tail means to the tether line at a spaced distance from the kite sufficient to prevent interference with the kite during flight,
   (d) filling said drogue tail means with a lighter-than-air fluid medium to provide sufficient buoyancy to lift the kite secured to the tether line in a no-wind condition,
   (e) deploying the tether line in no-wind condition under the lifting influence of the drogue tail means through the inversion layer until the kite enters the boundary layer,
   (f) said drogue tail means being flexibly secured to the tether line to align downwind with respect to the kite under active wind conditions in said boundary,
   (g) said kite in flight under active wind conditions in said boundary layer being effective to override the lifting buoyancy of the drogue tail means,
   (h) measuring tension force on the tether line when the kite is in the boundary layer, and (i) coordinating the tension force with the kite flying characteristics to determine the natural wind velocity.

4. The method as defined in claim 3 wherein the angular displacement of the tether line is measured within a vertical plane with respect to a fixed reference alignment to determine the vertical repose angle of the kite.

5. The method as defined in claim 3 wherein the angular displacement of the tether line is measured about a vertical axis with respect to a fixed reference alignment to determine the azimuth angle of the wind direction.

6. An assembly for determining wind flow currents along the surface of a stationary object, said assembly comprising:
 (a) a kite connected at one end of a tether line,
 (b) drogue tail means flexibly secured to the tether line a spaced distance from the kite sufficient to prevent any interference on the flight characteristics of the kite under active wind conditions and to align downwardly with respect to the kite under active wind conditions,
 (c) said drogue tail means being inflated with a fluid medium effective to provide a neutral density sufficient to balance the weight of the drogue tail means, and
 (d) means for recording the position of the drogue tail means while said kite is flying.

7. An assembly as defined in claim 6 wherein said recording means includes a camera for photographing said kite and drogue tail means in flight.

8. An assembly as defined in claim 6 wherein said drogue tail means is an elongated inflated tube having minimum drag characteristics, said inflated tube being sufficiently flexible to conform the shape thereof to the wind currents moving along the outer surface and parallel to the longitudinal axis thereof.

9. An assembly as defined in claim 6 wherein said kite has calibrated aerodynamic lift/drag flying characteristics, said aerodynamic characteristics being substantially unaffected by temperature and pressure changes.

10. An assembly as defined in claim 9 wherein sensing means is responsive to the tension force on the tether line when the kite is flying, wind velocity computational means is connected to the tether line for combining the tension force on the tether line with the lift/drag characteristics of the kite to determine the velocity of the wind which sustains the kite in flight.

11. A method of determining wind flow currents along the surface of a stationary object, said method comprising the steps of:
 (a) providing a kite having calibrated lift/drag flying characteristics that are substantially unaffected by temperature and pressure changes,
 (b) securing said kite to the end of a tether line,
 (c) connecting drogue tail means to the tether line at a spaced distance from the kite sufficient to prevent interference with the kite during flight,
 (d) filling said drogue tail means with a fluid medium effective to provide a neutral density sufficient to balance the weight of the drogue tail means,
 (e) flying the kite in the wind at a location along said surface,
 (f) measuring restraint force on the tether line during said flying step,
 (g) coordinating the restraint force with the kite flying characteristics to determine the natural wind velocity, and
 (h) recording the position of the drogue tail means during said flying step to determine the wind current flow at said location.

12. A method as defined in claim 11 wherein said recording step includes photographing the flying kite and drogue tail means at said location.

13. A method as defined in claim 11 wherein said recording step is effected at a plurality of locations of the flying kite and drogue tail means to determine a profile of the wind currents along the surface of the stationary object.

14. The method as defined in claim 13 wherein the stationary object is the ground.

15. The method as defined in claim 13 wherein the stationary object is an architectural structure.

16. An assembly for visually communicating natural wind conditions at a landing location to a vertical landing and take off aircraft, said assembly comprising:
 (a) tether anchor means for deployment at said landing location,
 (b) tether mast means secured to the anchor means, said mast having freedom of movement about a vertical axis,
 (c) natural wind condition monitoring means secured to the tether mast means, and
 (d) visual indicating means electrically connected to the monitoring means,
 (e) said visual indicating means having a structural configuration effective to visually transmit the natural wind conditions of velocity and direction to altitudes sufficient to be seen and read by the pilot of a landing aircraft.

17. An assembly as defined in claim 16 wherein the combination of the several elements in the assembly has a composite structural configuration effective to form a portable kit.

18. An assembly as defined in claim 16 wherein the tether anchor means is secured to a ground vehicle.

19. An assembly as defined in claim 18 wherein the ground vehicle is an emergency responding vehicle.

20. An assembly as defined in claim 16 wherein the tether mast has a free end, and the visual indicating means includes a wind direction trailing element disposed at the end of the tether mast to visually indicate wind direction, the visual indicating means further includes lighting means to illuminate the wind direction trailing means during darkness.

21. An assembly as defined in claim 16 wherein the tether anchor means and the visual indicating means are secured to the outside of an emergency responding ground vehicle.

22. An assembly as defined in claim 21 wherein the visual indicating means comprises a digital display panel on which the wind velocity and wind direction are displayed.

23. An assembly as defined in claim 16 wherein the tether anchor means, tether mast means, monitoring means and visual indicating means are detachably connected with respect to each other to form a kit, said visual indicating means includes display panel means on which the wind velocity and wind direction are displayed.

24. The combination as defined in claim 16 wherein wind velocity computational means combines the tension force measured by said line tension sensing means with the lift/drag characteristics of said vehicle to determine the velocity of wind which sustains said vehicle.

25. The assembly as defined in claim 16 wherein said visual indicating means includes a strobe light.

26. In combination with a windborne vehicle of known aerodynamic lift/drag characteristics substantially unaffected by temperature and pressure changes:
   (a) a ground anchor means,
   (b) tether mast means secured to said ground anchor means for rotative freedom about a vertical axis,
   (c) tether line means secured at one end thereof to said windborne vehicle,
   (d) tether line guide means secured to said mast means to align said mast means with said tether line when said windborne vehicle is in flight,
   (e) angle sensing means being effective to measure the azimuth angular displacement of said mast means about said vertical axis with respect to a fixed reference alignment,
   (f) tether line tension sensing means for measuring the tension force on said tether line when the windborne vehicle is in flight, and
   (g) signal transmitting means for transmitting signals proportional to said angular displacement and said tension force to a remote receiving station.

27. The combination as defined in claim 26 wherein the windborne vehicle is a wind direction trailing element disposed at a fixed location on said tether mast means.

28. The combination as defined in claim 27 wherein said wind direction trailing element is a banner.

29. The combination as defined in claim 27 wherein said wind direction trailing element is a kite.

30. The combination as defined in claim 27 wherein the other end of the tether line means is secured to a reel means, and
   the windborne vehicle is a kite having lift characteristics effective to cause the kite to fly under active wind conditions with the tether line means being deployed from the reel means,
   said reel means being effective to retract the tether line means under no-wind conditions.

31. The combination as defined in claim 30 wherein said reel means includes line counting means for maintaining an accounting of tether line distance deployed from said reel means.

32. The combintion as defined in claim 31 wherein said tether line means is movably secured to the tether mast means by a line guide means to align the mast means with the tether line means when the kite is in flight,
   said angle sensing means being effective to measure the vertical repose angular displacement of the tether line means within a vertical plane with respect to a fixed reference alignment, and
   altitude computational means is effective to combine the line distance accounting of said line counting means with the vertical repose angular displacement to determine the flight altitude of the kite.

33. The combination as defined in claim 26 wherein the said reel means is spring biased to a retracted position.

34. A method of measuring the velocity of a natural wind, said method comprising the steps of:
   (a) calibrating the aerodynamic lift/drag flying characteristics of a tethered flight vehicle,
   (b) said aerodynamic characteristics being substantially unaffected by temperature and pressure changes,
   (c) flying said vehicle in said natural wind at the end of a tether,
   (d) measuring restraint force on said tether during said flight,
   (e) coordinating said restraint force with said vehicle flight characteristics to determine said natural wind velocity.

35. A method as described by claim 34 wherein said vehicle is of the heavier-than-air type.

36. An assembly for monitoring natural wind conditions, said assembly comprising:
   (a) a flight vehicle having calibrated aerodynamic lift/drag flying characteristics,
   (b) said aerodynamic characteristics being substantially unaffected by temperature and pressure changes,
   (c) means for flying the vehicle in a natural wind at the end of a line,
   (d) means for sensing tension force on the line when the vehicle is flying, and
   (e) means connected to the line for indicating the direction of the natural wind in which the vehicle is flying.

37. The assembly as defined in claim 36 wherein said vehicle is of the heavier-than-air type.

38. The assembly as defined in claim 36 wherein said flying means includes a ground anchor means and tether mast means secured to the ground anchor means for rotative freedom about a vertical axis.

39. The assembly as defined in claim 36 wherein said flying means includes a ground anchor means, tether mast means, line guide means and reel means,
   said tether mast means being secured to the ground anchor means for rotative freedom about a vertical axis,
   said line being secured at one end thereof to the reel means, and
   the line guide means being secured to the tether mast means to align the mast means with said line when the windborne vehicle is in flight.

40. The assembly as defined in claim 39 wherein said reel means includes line counting means for maintaining an accounting of line distance deployed from said reel.

41. The assembly as defined in claim 40 wherein said direction indicating means includes vertical repose angle sensing means for measuring the angular displacement of the line within a vertical plane relative to a fixed reference alignment, and
   altitude computational means is effective to combine the line distance accounting of said line counting means with the angular displacement measured by said vertical repose angle sensing means to determine the flight altitude of said vehicle.

42. The assembly as defined in claim 36 wherein said flying means includes a ground anchor means and a tether mast means, said direction indicating means includes azimuth angle sensing means for measuring the angular displacement of the tether mast means about the vertical axis with respect to a fixed reference alignment.

43. The assembly as defined in claim 42 wherein said direction indicating means includes vertical repose angle sensing means for measuring the angular displacement of the line within a vertical plane with respect to a fixed reference alignment.

44. The assembly as defined in claim 36 wherein said direction indicating means includes display means for disposition in an aircraft.

45. The assembly as defined in claim 36 comprising wind velocity computational means for combining tension measured by said line tension sensing means with the lift/drag characteristics of the flight vehicle to determine the velocity of the wind which sustains the vehicle in flight.

46. An assembly for monitoring natural wind conditions, said assembly comprising:
   (a) a flight vehicle having calibrated aerodynamic lift/drag flying characteristics being stable beyond a 40 mph wind velocity, said characteristics being substantially unaffected by temperature and pressure changes,
   (b) means for flying the vehicle in a natural wind at the end of a line,
   (c) means connected to the line for measuring tension on the line when the vehicle is flying to determine the velocity of the natural wind.

47. The assembly as defined in claim 46 wherein said vehicle is of the lighter-than-air type.

48. The assembly as defined in claim 46 wherein said vehicle is of the heavier-than-air type.

49. The assembly as defined in claim 46 wherein said flying means includes a ground anchor means and tether mast means secured to the ground anchor means for rotative freedom about a vertical axis.

50. The assembly as defined in claim 46 wherein said flying means includes a ground anchor means, tether mast means, line guide means and reel means,
said tether mast means being secured to the ground anchor means for rotative freedom about a vertical axis,
said line being secured at one end thereof to the reel means, and
the line guide means being secured to the tether mast means to align the mast means with said line when the windborne vehicle is in flight.

51. The assembly as defined in claim 50 wherein said reel means includes line counting means for maintaining an accounting of line distance deployed from said reel.

52. The assembly as defined in claim 51 wherein said tension measuring means is connected to means for indicating wind velocity, and
means is connected to the tether line for indicating the direction of the natural wind in which the flight vehicle is flying,
said direction indicating means includes vertical repose angle sensory means for measuring the angular displacement of the tether line within a vertical plane relative to a fixed reference alignment, and
altitude computational means is effective to combine the line distance accounting of said line counting means with the angular displacement measured by said vertical repose angle sensory means to determine the flight altitude of said vehicle.

53. The assembly as defined in claim 46 comprising wind velocity computational means for combining the strain measured by said line strain sensing means with the lift/drag characteristics of the flight vehicle to determine the velocity of the wind which sustains the vehicle in flight.

54. A portable meterological kit assembly comprising:
   (a) a housing means,
   (b) tether anchor means secured to said housing means,
   (c) tether mast means detachably secured to the anchor means,
   (d) a flight vehicle having calibrated aerodynamic lift/drag characteristics which are substantially unaffected by temperature and pressure changes,
   (e) tether line means detachably secured at one end thereof to the flight vehicle,
   (f) tether line guide means secured to said mast means to align said mast means with said tether line when the flight vehicle is in flight,
   (g) means disposed in said housing means for sensing tension force on the tether line when the vehicle is flying, and
   (h) means disposed in said housing means connected to the tether line for indicating the direction of the natural wind in which the vehicle is flying.

55. The assembly as defined in claim 54 wherein angle sensing means being effective to measure the azimuth angular displacement of said mast means about said vertical axis with respect to a fixed reference alignment.

56. The assembly as defined in claim 54 wherein the other end of the tether line means is secured to reel means,
said reel means includes line counting means for maintaining an accounting of line distance deployed from said reel.

57. The assembly as defined in claim 56 wherein said direction indicating means being disposed in said housing means and including vertical repose angle sensing means for measuring the angular displacement of the line within a vertical plane relative to a fixed reference alignment, and
altitude computational means disposed in said housing means and being effective to combine the line distance accounting of said line counting means with the angular displacement measured by said vertical repose angle sensing means to determine the flight altitude of said vehicle.

58. An assembly as defined in claim 54 wherein wind velocity computational means for combining tension measured by said line tension sensing means with the lift/drag characteristics of the flight vehicle to determine the velocity of the wind which sustains the vehicle in flight.

59. The assembly as defined in claim 58 wherein visual indicating means is disposed in the housing means and electrically connected to display the natural wind conditions of velocity and wind direction.

60. The assembly as defined in claim 59 wherein said visual indicating means includes a digital display panel means.

61. The assembly as defined in claim 59 wherein said visual indicating means includes a continuous readout recorder.

62. The assembly as defined in claim 54 wherein said tether mast means and said flight vehicle means are detachably stored in said housing means.

63. An assembly for visually communicating natural wind conditions at an aircraft landing location, said assembly comprising:
   (a) ground anchor means for deployment at said landing location,
   (b) tether mast means secured at one end thereof to the ground anchor means for rotative freedom about a vertical axis,
   (c) a wind direction trailing element fixedly disposed at the other end of the tether mast means to visually indicate wind direction, and
   (d) shaped surface means secured to the rotatable tether mast means,
   (e) said surface means being visually identified with two colors to coordinate with upwind and downwind directions.

64. An assembly as defined in claim 63 wherein said wind direction trailing element is a banner.

65. An assembly as defined in claim 63 wherein a portion of the tether mast means is disposed at an angle with respect to the vertical.

66. An assembly as defined in claim 63 wherein said shaped surface means is in the form of a cone or cylinder.

* * * * *